United States Patent
King et al.

(10) Patent No.: US 9,986,101 B2
(45) Date of Patent: May 29, 2018

(54) SYSTEM, METHOD, AND COMPUTER PROGRAM PRODUCT FOR CONNECTING OR COUPLING ANALOG AUDIO COMMUNICATIONS SYSTEMS OVER A WIRELESS PACKET DATA NETWORK

(71) Applicant: NSGDatacom Inc., Chantilly, VA (US)

(72) Inventors: Graham King, Clifton, VA (US); Simon Tiley, Chantilly, VA (US)

(73) Assignee: NSGDatacom Inc., Chantilly, VA (US)

( * ) Notice: Subject to any disclaimer, the term of this patent is extended or adjusted under 35 U.S.C. 154(b) by 248 days.

(21) Appl. No.: 14/801,833

(22) Filed: Jul. 17, 2015

(65) Prior Publication Data

US 2017/0019537 A1 Jan. 19, 2017

(51) Int. Cl.
- H04M 7/00 (2006.01)
- H04L 29/06 (2006.01)
- H04W 84/04 (2009.01)

(52) U.S. Cl.
CPC ........ H04M 7/006 (2013.01); H04L 65/1026 (2013.01); H04L 65/605 (2013.01); H04W 84/042 (2013.01)

(58) Field of Classification Search
CPC . H04M 7/006; H04M 7/0069; H04L 65/1026; H04L 65/605
See application file for complete search history.

(56) References Cited

U.S. PATENT DOCUMENTS

| | | | | |
|---|---|---|---|---|
| 2004/0141484 A1* | 7/2004 | Rogalski | ........... | H04L 29/06027 370/338 |
| 2007/0263598 A1* | 11/2007 | Chen | ................ | H04L 29/06027 370/352 |
| 2009/0257345 A1* | 10/2009 | King | ...................... | H04L 41/22 370/216 |
| 2012/0106543 A1* | 5/2012 | King | ...................... | H04L 45/22 370/352 |
| 2012/0113804 A1* | 5/2012 | Zhang | ................ | H04L 12/2878 370/228 |

OTHER PUBLICATIONS

NSGDatacom, "VoIP Primer", Apr. 25, 2014, www.nsgdata.com, pp. 1-23.*

(Continued)

*Primary Examiner* — Paul H Masur
(74) *Attorney, Agent, or Firm* — ATFirm PLLC; Ralph P. Albrecht

(57) ABSTRACT

An automated telecommunications system includes a first system operable to receive PSTN compatible audio frequency signals, to decode and interpret said incoming signals according to the type of call and call format, and transmit digital messages to a second system over a packet data network. Said second system receives and interprets digital messages incoming from the first system, encodes and regenerate outgoing audio frequency signals. The system may be bidirectional and operate over a packet based data network, such as for example an IP based wireless data network. The functionality of said first and second systems may be combined at a single location and interface with a VoIP system at either or both ends and allows PSTN and VoIP communications to share the same packet data stream over a wireless network connection.

30 Claims, 12 Drawing Sheets

(56) References Cited

OTHER PUBLICATIONS

NSGDatacom, Nx2222 Data Sheet, Oct. 16, 2013, www.nsgdata.com, pp. 1-4.*
Hettick, Larry, "Replacing PSTN with VoIP: Not If, But When", Jan. 13, 2015, Webtorials, www.webtorials.com, pp. 1-2.*
Hettick, Larry, "Why Replacing the PSTN with VoIP Won't Be Easy", Jan. 5, 2015, Webtorials, www.webtorials.com, pp. 1-2.*

* cited by examiner

SYSTEM, METHOD, AND COMPUTER PROGRAM PRODUCT FOR CONNECTING OR COUPLING ANALOG AUDIO COMMUNICATIONS SYSTEMS OVER A WIRELESS PACKET DATA NETWORK

FIELD OF THE DISCLOSURE

The present invention relates generally to the transmission of analog audio-based communications such as voice, fax and dial modem transmission over a digital wireless packet data network.

BACKGROUND OF DISCLOSURE

Related References

Many older 'legacy' telecommunications systems use dial-up telephone lines for voice calls, calls between facsimile machines and calls between analog dial-up modems. Over recent years dial-up telephone lines have been gradually replaced by cell-phone connections and more recently still by land-based IP data packet connections, such as provided by broadband Internet Service Providers (ISPs). It is desirable that eventually analog telephone lines will be completely replaced by IP based data packet connections which will comprise a combination of 'standard' land-based, high speed Voice over IP (VoIP) services (such as fiber and cable), and new cellular wireless services based on the LTE (Long Term Evolution) standard also known as 4G, or 5G and beyond.

Except for a few plans limited in both availability and capability, the conventional 4G LTE data services currently being offered by the Cellular Wireless carriers do not support cell phone voice traffic. 'Standard' cell-phone voice calls are placed over the established 3G wireless infrastructures, whereas only data connections (such as Web browsing) are supported by the 4G LTE data service. In other words, most if not all conventional 4G cell phone services do not combine voice calls and data calls over the same data packet infrastructure. It is desirable that the next step in 4G evolution include convergence of voice and data services over a common packet based architecture.

Moving voice calls from 3G to the common packet based infrastructure of 4G presents a number of new technical challenges driven by the fact that standard cell phone quality is generally considered not good enough to become part of future LTE. More specifically, if cellular wireless is to become a viable alternative to copper for last mile connectivity, then the quality of voice calls must be virtually indistinguishable from the quality currently possible from a good landline connection. For most business use, current cell-phone voice quality is not good enough to become a viable replacement to the PSTN (Public Switched Telephone Network).

The use of standard VoIP solutions over wireless LTE connections is also problematic. Standard, uncompressed VoIP when used over a broadband connection should theoretically be indistinguishable from a normal analog telephone call. When a service provider controls end-to-end connection of VoIP calls this can generally be case. However, it is also a common user experience that packet delays, dropped packets and other IP introduced artifacts can easily degrade VoIP calls to the point where they become unusable, even when no wireless link is involved. When a wireless link is added into the communication path, the difficulty of maintaining a consistent, high quality telephone call, is increased. In addition to providing a lower bandwidth connection than terrestrial circuits, wireless links are well known for being less robust than broadband circuits, increasing the likelihood of dropped packets and introducing additional jitter and delay into the communications path.

A process commonly used on VoIP calls to counter IP based network effects is voice compression. Voice compression has the effect of reducing the bandwidth required to support the audio signal, which can improve consistency and dependability of packet delivery over a congested network.

The digital audio stream generated by the PSTN normally conforms to the G.711 standard and can have a digital data rate of 64 Kbps. G.711 is the standard used by the digital hierarchy of the PSTN, sometimes known as full rate voice, or toll quality voice. In uncompressed VoIP applications the packet network effectively performs the same connection function for the G.711 audio stream as a standard digital telephone network. The primary difference is that the packet network introduces a transmission delay that varies from packet to packet. This variation in delay is known as jitter. Buffers in the end-point VoIP devices absorb jitter to some extent, but there is always a trade-off between the magnitude of jitter that can be absorbed and the delay that can be tolerated by users.

For any packet-based connection, if the packet delay exceeds the depth of the jitter buffer, even for a short period, then the missing or 'late' packets will create temporary gaps in the audio. The problem is particularly acute where the packet network experiences relatively long delays, such as over a satellite link, where any additional delay over and above the inevitable satellite round-trip delay is particularly noticeable. In the case of cellular wireless data connections the possibility of packet loss and jitter both exceed that of a typical satellite service. As a result, maintaining the quality of VoIP calls over cellular wireless data connections is generally a harder task than over more consistent satellite links.

Many VoIP devices designed to intercommunicate with the PSTN compress the G.711 audio stream to minimize the amount of data sent over the IP packet network. This can reduce the delay and jitter experienced by the recipient and also reduce the likelihood of packet being lost or discarded somewhere in the network. There are a large number of voice compression standards in use, for example G.722, G.723, G.726, G.728, G.729 are compression algorithms that are commonly used in standard cell phones or VoIP systems that intercommunicate with the PSTN. Other, more recent "high definition" or wideband speech codecs such as G.722.1 and G.722.2 offer improved speech quality but provide no advantage when coupled to the PSTN since they are optimized for a broader spectrum than the 300 Hz to 3000 Hz bandwidth limitation of the PSTN. Using voice compression techniques the data rate is reduced from full rate to a fraction, and many commonly used VoIP algorithms operate at an eighth rate or less. G.729 Annex B, for example, operates at 8 Kbps and is considered to be very close to toll quality when used under ideal network conditions.

However, in standard VoIP systems the bandwidth saved using voice compression is often offset by the addition of TCP/IP packet overhead and the requirements of call session management. For example, a typical VoIP call using G.729 compression still creates a 30 Kbps IP data stream. Since only 8 Kbps is the compressed voice payload, the bulk (approximately 22 Kbps) is network routing and management overhead.

Furthermore, since all voice compression algorithms function by discarding information during the compression process the inevitable result is that the audio signal output at the receiving end of the link is to some extent a distortion of the input audio signal. Most advanced PSTN compatible voice compression algorithms are structured to retain those qualities that optimize voice recognition by the human ear and not to retain the exact frequency and phase qualities of the incoming signal. Consequently, even though the audio may sound close to perfect to the human ear, the decoders of analog modems and fax machines that rely on exact frequency and phase information cannot normally decode signals that have been transmitted over VoIP systems using compression. Even for voice calls, additional complexities arise when there is high background noise, a combination of speech and music, or multi-party conferencing.

As a result, the use of compression on conventional VoIP calls is largely restricted to circumstances where bandwidth is at a premium and a slight but noticeable degradation in call quality is an acceptable trade-off with respect to the accrued cost savings. Satellite links are a prime example of where bandwidth is expensive and always at a premium. Standard 3G cellular telephone calls use digital compression in order to maximize call capacity of cell phone networks.

The difficulty of providing toll quality audio over wireless 3G data services using existing cell phone or VoIP techniques is evident. The advantage of 4G over 3G cellular data is that 4G LTE has much higher bandwidth, shorter delays and less jitter, but 4G LTE is still a packet-based network with it's inherent network characteristics and the challenge to establish and maintain toll quality voice calls remains. Without compression, the effects of network jitter and dropped packets can still degrade the user experience to below the threshold of acceptable service. With compression, the capabilities of the service are mostly limited to voice calls only. Additionally, the network capacity required to support multiple simultaneous voice calls in a typical office environment can stretch the capability of even 4G wireless data circuits, not only due to the total bandwidth used, but also due the large number of packets generated in each direction when many calls are in progress.

The successful convergence of voice and data on 4G LTE is dependent upon the use of more than just an improvement in the audio compression algorithms. High Definition voice systems may eventually replace the PSTN completely, but these systems do not interface with standard telephone systems, which are typically bandwidth limited between 300 and 3000 Hz. To ensure the highest audio quality and stability for PSTN compatible voice calls a combination of other techniques must be utilized to minimize the negative impact of network limitations, call requirements and user environment. If the LTE cellular wireless data service is to become a viable option for local loop analog line replacement, an alternative solution is needed that overcomes the shortcomings of conventional VoIP solutions.

SUMMARY OF THE DISCLOSURE

The present disclosure sets forth various exemplary embodiments of apparatus, systems, methods and computer program products for the transmission of audio communications over an LTE wireless packet based data network.

An exemplary embodiment sets forth an automated system that may include a first system that may analyze the incoming signal originating from a first analog communications device operable to process the incoming signal and may transmit a digital message over an LTE wireless packet data network according to rules defined for the first system, and may further include a second system that may receive said message from the LTE wireless packet data network operable to generate an analog compatible signal and transmit said signal to a second analog communications device, where such analog signal may be generated according to the received data and rules defined for the second system.

In an exemplary embodiment, said second system may also receive an incoming signal originating from said second analog communications device operable to process the incoming signal and may transmit a digital message over an LTE wireless packet data network according to rules defined for the second system, and said first system may receive information from the LTE wireless packet data network operable to generate an analog compatible signal and transmit said signal to said first communications device, where such analog signal maybe generated according to the received data and rules defined for the first system.

In an exemplary embodiment, said analog communications device(s) may connect to said first and second systems through an optional switching system such as, e.g., but not limited to, a Private Branch Exchange (PBX) system, a Key system, or a carrier class switch which may digitize or regenerate said analog signal(s) according to industry standards.

In an exemplary embodiment, said LTE wireless packet data network may be any wireless data network, such as, e.g., but not limited to, an internet protocol (IP) network that may operate over a wireless link and may have varying delay depending on the network performance at any particular time.

In an exemplary embodiment, said rules for the system includes a mechanism whereby analog information may be digitized; digital information may be accumulated prior to transmission; compressed according to a pre-specified compression rules; and transmitted over a wireless packet data network using a data link protocol, said data link protocol being optimized for the transmission of analog communications over an LTE wireless packet data link according to one or more of; the content of the audio stream; network characteristics; preprogrammed rules; and operational parameters programmed into the exemplary system.

In another exemplary embodiment, the said first or second analog communications devices or both may connect to a packet data network using, e.g., but not limited to, a VoIP connection such that analog signal may be received by the first and second systems directly from a packet data network as uncompressed or compressed voice (VoIP) data or from a PSTN connection after passing through a VoIP to PSTN gateway device.

An exemplary embodiment sets forth an automated system, method, and/or computer program product for transmitting and receiving PSTN compatible analog or digital audio frequency signals over an LTE wireless packet data network, which may include, in an exemplary embodiment, a first system operative to: receive incoming PSTN compatible audio frequency signals; analyze and process said incoming audio signals; digitize incoming analog audio signals; accumulate said digital or digitized audio signals; compress said accumulated digital or digitized audio signals using preprogrammed rules; transmit a digital message containing said compressed audio signals to a second system using preprogrammed rules and a data link protocol optimized for the transmission of analog communications over a LTE wireless packet network; a second system operable to receive and interpret incoming digital messages from the first system; and decode and regenerate outgoing audio frequency PSTN compatible signals using preprogrammed rules for the second system.

In the system according to an exemplary embodiment, may include where said analog communications device(s) connect to said first and second systems through an optional switching system such as, e.g., but not limited to, a Private Branch Exchange (PBX) system, a Key system, or a carrier class switch which may digitize or regenerate said analog signal(s) according to industry standards.

The system according to an exemplary embodiment may include where the LTE wireless packet data network comprises an Internet Protocol (IP) based network.

The system according to an exemplary embodiment may include where the LTE wireless packet data network comprises in part a satellite network.

The system according to an exemplary embodiment may include where the LTE wireless packet network data comprises at least one of a cable, a fiber or an other type of terrestrial based network.

The system according to an exemplary embodiment may include where said first system and said second system are located at least one of: at a single location, or at different locations.

The system according to an exemplary embodiment may include where provided an ability to interface to a VoIP packet system.

The system according to an exemplary embodiment may further include where at least one of: audio compression, or audio decompression, by at least one of: PSTN, or VoIP systems.

The system according to an exemplary embodiment may include where the system uses at least one of: predetermined information, learned information, or preconfigured information, to determine said preprogrammed rules to apply to the compression and to the transmission of PSTN-compatible audio signals between said first and second systems.

The system according to an exemplary embodiment may further include where a control channel comprising at least one of: an in-band control channel, or an out-of-band control channel, said control channel operable to remotely manage said first and second systems, and wherein said control channel is operable to provide communications to perform at least one of: provide monitoring function; provide a control function; determine real time diagnostic information; determine status information; or determine ancillary information.

The system according to an exemplary embodiment may include where the first system is operative to process at least one of: compress digitized audio prior to transmission according to pre-programmed compression rules; transmit over a wireless packet data network using a data link protocol optimized for the transmission of analog communications over an LTE wireless packet data network using pre-programmed rules.

An exemplary embodiment sets forth an automated system, method, and/or computer program product for transmitting and receiving public switched telephone network (PSTN) compatible analog or digital audio signals over an LTE wireless packet data network, where the method may include: receiving first incoming PSTN-compatible audio frequency signals; analyzing and processing said incoming signals; digitizing incoming analog audio signals; accumulating said digital or digitized audio signals; compressing said digital or digitized incoming audio signals using pre-programmed rules; transmitting a message containing said compressed audio signals to a second system using preprogrammed rules using a data link protocol optimized for the transmission of analog communications over an LTE wireless packet network; receiving and interpreting a second incoming digital messages from the first system; and decoding and regenerating outgoing audio frequency PSTN compatible signals using preprogrammed rules for the second system.

The method according to an exemplary embodiment, may include where said analog communications device(s) connect to said first and second systems through an optional switching system such as, e.g., but not limited to, a Private Branch Exchange (PBX) system, a Key system, or a carrier class switch which may digitize or regenerate said analog signal(s) according to industry standards.

The method according to an exemplary embodiment may include where the LTE wireless packet data network comprises an Internet Protocol (IP) based network.

The method according to an exemplary embodiment may include where the LTE wireless packet data network comprises in part a satellite network.

The method according to an exemplary embodiment may include where the LTE wireless packet network data comprises at least one of a cable, a fiber or an other type of terrestrial based network.

The method according to an exemplary embodiment may include where said first system and said second system are located at least one of: at a single location, or at different locations.

The method according to an exemplary embodiment may further include where providing the ability to interface to a VoIP packet system.

The method according to an exemplary embodiment may further include where compressing or decompressing, at least one of: PSTN compatible, or VoIP compatible audio signals.

The method according to an exemplary embodiment may include where using at least one of: predetermined information, learned information, or preconfigured information, in determining said preprogrammed rules to apply to the compression and to the transmission of PSTN-compatible audio signals between said first and second systems.

The method according to an exemplary embodiment may further include where using a control channel comprising at least one of: an in-band control channel, or an out-of-band control channel, said control channel operable to remotely manage said first and second systems, and wherein said control channel comprises providing communications performing at least one of: providing monitoring function; providing a control function; determining real time diagnostic information; determining status information; or determining ancillary information.

The method according to an exemplary embodiment may include where the first system comprises providing at least one of: compressing digitized audio prior to transmission according to pre-programmed compression rules; transmitting over a wireless packet data network using a data link protocol optimized for the transmission of analog communications over an LTE wireless packet data network using pre-programmed rules.

An exemplary embodiment sets forth an automated system, method, and/or computer program product, where the machine-readable medium that provides instructions, which when executed by a computing platform, causes said computing platform to perform operations, which may include: a method for receiving first incoming PSTN-compatible analog or digital audio frequency signals; analyzing and processing said incoming signals; digitizing incoming analog audio signals; accumulating said digital or digitized audio signals; compressing said digital or digitized incoming audio signals using preprogrammed rules; transmitting a message containing said compressed audio signals to a second system using preprogrammed rules using a data link protocol optimized for the transmission of analog communications over an LTE wireless packet network; receiving and interpreting a second incoming digital message from the first system; and decoding and regenerating outgoing audio frequency PSTN compatible signals using preprogrammed rules.

The computer program product according to an exemplary embodiment where the method may include where the method comprises: performing functions of said first system and said second system at least one of: at a single location, or at different locations.

The foregoing embodiments, together with embodiments directed to methods and products thereof, are described in greater detail below.

BRIEF DESCRIPTION OF THE DRAWINGS

Various exemplary features and advantages of the invention will be apparent from the following, more particular description of exemplary embodiments of the present invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF VARIOUS EXEMPLARY EMBODIMENTS OF THE DISCLOSURE

Figure 1:
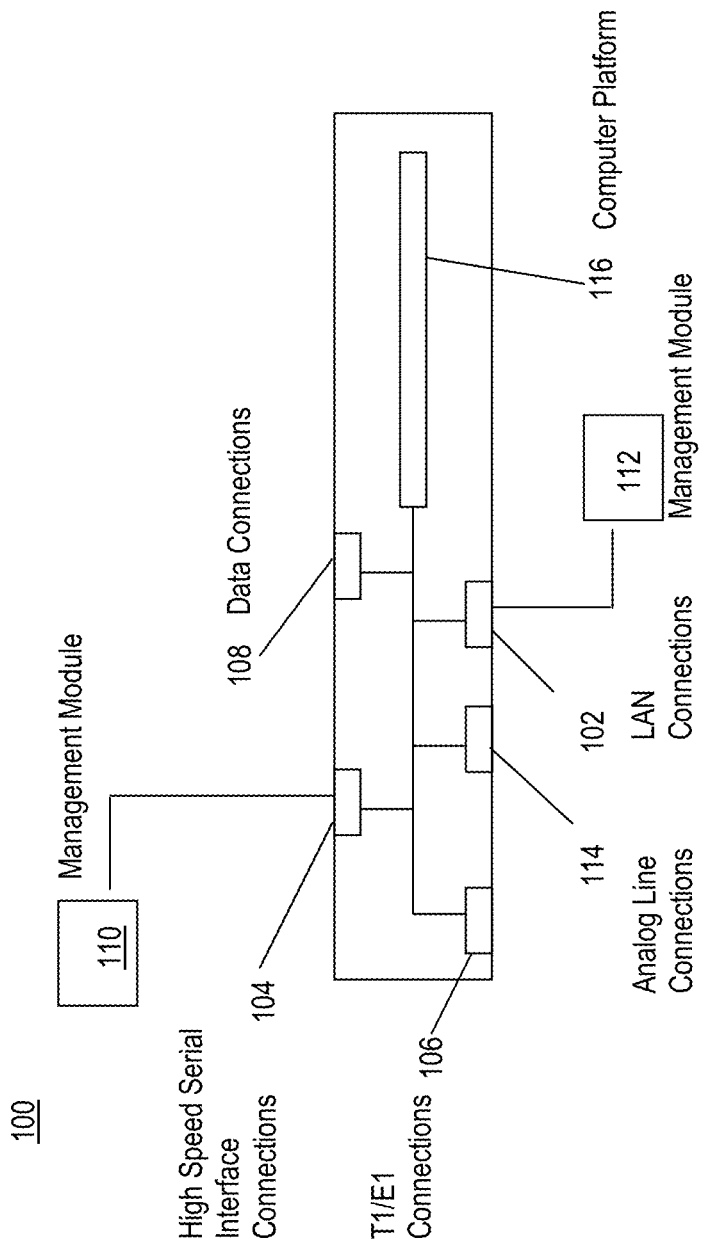
FIG. 1 illustrates an exemplary device in accordance with the present exemplary embodiments.

Various preferred exemplary embodiments of the disclosure including any preferred embodiments are discussed in detail below. While specific exemplary embodiments are discussed it should be understood that this is for illustrative purposes only and not be in way of limitation. A person skilled in the relevant art will recognize that other configurations, modifications, implementations and/or substantially similar alternative embodiments may be used without parting from the spirit and scope of the invention.

Introduction

Analog Public Switched Telephone Network (PSTN) lines are being phased out and replaced by IP packet data networks for many reasons. IP packet data networks are widely accessible using terrestrial fiber, cable, wireless and satellite connections. They provide a common architecture for the convergence of all types of communication with immediate, enhanced capability and are generally more cost effective to maintain than dial up telephone lines.

Whereas voice and modem computer communications benefit from being moved from analog lines to broadband IP packet networks, the move from dial-up lines to wireless cellular data networks is more problematic. A number of inter-related factors affect the ability of wireless data services to support dependable toll quality voice calls. These include bandwidth limitations (compared with broadband terrestrial links), network delay and jitter, plus of course the overall stability of wireless links generally with respect to outside interference, weather and atmospheric variations in signal strength. As a result, 3G wireless data services have not emerged as a practical alternative to the PSTN for last mile connectivity when dependable toll quality voice connections are required.

The introduction of LTE 4G wireless data networks offers the promise of a new level of performance upon which a converged service platform will be based. Nevertheless, the inevitable problems of network delay, jitter and stability still exist on 4G. While being a significant improvement over 3G, the negative effects are far greater than on broadband, often even to a greater extent than over satellite systems. Problems are magnified when the requirement is to support multiple simultaneous calls, with a combination of voice, facsimile and dial modem connections over a single cellular wireless data connection. The present invention addresses the problems of supporting toll quality analog voice connections over the LTE wireless data packet network.

Overview of Exemplary Embodiments:

The exemplary embodiments may provide an apparatus, a method and/or computer program product for the transmission of audio communications over an LTE wireless packet based data network. In the exemplary embodiments, the system utilizing audio communications may comprise a standard analog communications device that may normally connect or couple to a second analog communications device through a PSTN connection. The analog communications device may be, e.g., but not be limited to, a telephone handset, a PBX system, a fax machine or an analog dial modem using audio tones for communications. In the exemplary embodiments the wireless packet data network may be, e.g., but not be limited to, an LTE wireless Internet Protocol (IP) network. For example, a cellular wireless IP data connection or other wireless based IP network may be used to provide all or part of the primary, or all or part of a backup connection between coupled analog communications devices.

Exemplary Embodiments:

The present exemplary embodiments can be performed by, e.g., but not limited to, one or more products available from NSGDATACOM, INC. of Chantilly, Va. USA and/or another, or an adaptation thereof in accordance with the present exemplary embodiments. Such exemplary products may include, e.g., but not limited to, devices 100 access router Wi-Modem™, access router V-Turbo™ and Network exchange Nx2222™ among others.

An exemplary device 100, may include, in an exemplary embodiment, a public switched telephone network (PSTN) and/or other data interfaces designed to connect and/or couple analog voice, facsimile, dial modem and/or data to e.g., but not limited to terrestrial, wireless, and/or satellite IP networks. The exemplary device 100 may have multiple exemplary interfaces of each of various types and function as a telecommunications switching platform for, e.g., but not limited to aggregating, optimizing and/or routing simultaneous calls over at least single IP network connection.

Referring to FIG. 1, device 100 may provide hardware, software, or a combination thereof to provide an integrated and/or scalable exemplary design. As shown, the exemplary device may include, e.g., but not limited to, multiple 10/100/1000 Ethernet LAN connections 102, one or more high speed serial interfaces 104, one or more Analog PSTN connections 106, and/or one or more data connections 108.

Exemplary LAN connections 102 may include, for example, but not limited to multiple integrated switched Ethernet interfaces, auto sensing enabled 10BaseT, 100BaseT or 1000BaseT user or hub connectivity, etc.

Exemplary high speed serial interfaces 104 may include, for example, but not limited to, RJ 45 interfaces, internal or external clocking, software configurable DTE/DCE, V.24/RS-232/V.35/RS-449, /X.21, and/or high speeds from, for example, but not limited to, 1200 bps to 2.048 Mbps etc. Exemplary connections may include, for example, but not limited to, X.25, Frame Relay NM, UNI, FRF4/ITU, Q.933, Frame Relay Annex D, LMI, including PVC and/or SVC support, etc.

Exemplary T1/E1 connections 106 may provide, e.g., but not limited to, digital voice, fax, dial modem and/or data, up to multiple channels of voice compression, drop and insert for DS0/timeslots between interfaces, support for CAS and ISDN, transparent pass through for signaling via SS7, and/or transparent TDM clock recovery over IP, etc. Exemplary voice, and/or facsimile connections may include, for example, support for CAS/ISDN/E&M, H.323, SIP, B2BUA, G.711, G723, G.729a, CELP 4.8/7.4 kbps, Algebraic code-excited linear prediction (ACELP) 5.5/8.0 kbps, V.27ter, V.29 and/or Group III. Exemplary dial modem protocols may include, e.g., but not limited to, FSK, PSK, DTMF, QAM or Pulse modulation, V14, V17, Bell 101, Bell 103, V21, V.22, V.22bis, Bell 212A, V.23, Bell 202, V.26, V.26bis, V.27ter, V.29, V.32, V.32bis, V.34, V.42, V.42bis, V.44, V.90, and/or V.92, etc.

Exemplary data connections 108 may include internal and/or external clocking, software configurable DTE/DCE, V.24/RS-232/V.35/RS-449, /X.21, and/or speeds from, for example, but not limited to, 1200 bps to 2.048 Mbps, etc. Exemplary connections may include, for example, but not limited to, Asynchronous or Synchronous data, X.25, Frame Relay NM, UNI, FRF4/ITU, Q.933, Frame Relay Annex D, LMI, including PVC and/or SVC support, etc.

Exemplary Analog line connections 114 may include, for example RJ 45 or RJ11 interfaces, FXS, FXO, E&M software configurable voice, fax, dial modem and/or data. Exemplary voice, and/or facsimile connections may include, for example, support for CAS/ISDN/E&M, H.323, SIP, B2BUA, G.711, G.729a, CELP 4.8/7.4 kbps, Algebraic code-excited linear prediction (ACELP) 5.5/8.0 kbps, V.27ter, V.29 and/or Group III. Exemplary dial modem protocols may include FSK, PSK, DTMF, QAM or Pulse modulation, Ademco Contact ID Protocol, V14, V17, Bell 101, Bell 103, V21, V.22, V.22bis, Bell 212A, V.23, Bell 202, V.26, V.26bis, V.27ter, V.29, V.32, V.32bis, V.34, V.42, V.42bis, V.44, V.90, and/or V.92.

A management module 110 may interface with device 100, through for example, high speed serial interface connections 104. Management module 110 may include, for example, a Graphical User Interface (GUI) hosted, for example, by a Microsoft Windows® PC, etc. Configuring, monitoring and troubleshooting over public, private or hybrid networks may be provided. Distributed management of existing equipment via Simple Network Management Protocol (SNMP) may also be provided.

Management may also be provided remotely. For example, a management module 112 may provide remote management support over exemplary T1/E1 connections 106 and/or 108. In an exemplary embodiment, device 100 is remotely configurable through a Telnet session through a remotely attached exemplary MICROSOFT WINDOWS® PC, etc.

In one or more embodiments device 100 may include an internal or remotely accessible computer platform 116 that can perform any and all functions associated with internal processing and the foregoing network connections and associated protocols. The computer platform 116 can receive and execute software applications and display data transmitted from a management module or another computer device. The computer platform 116 may include an application-specific integrated circuit ("ASIC"), or other chipset, processor, microprocessor, logic circuit, Digital Signal Processor ("DSP"), or other data processing device. The ASIC or other processor may execute an application programming interface ("API") that interfaces with any resident programs, in a memory of the device 100. The API may be a runtime environment executing on the device 100, to operate to control the execution of applications on the device. The memory may include read-only and/or random-access memory (RAM and ROM), EPROM, EEPROM, flash cards, or any memory common to the computer platform 116. The computer platform 116 may also include a local database that can hold the software applications, or data not actively used in memory. The local database may include flash memory cells, or secondary storage, such as optical or magnetic media, tape, or soft or hard disk. In addition, computer platform 116 may be replaced by and/or may function in addition to any or all of the components of computer system 400 shown in FIG. 4.

In an exemplary embodiment, computer platform 116 may provide device 100 the capability to decode PSTN analog tones using standard DSP techniques and/or standard modem protocols. The computer platform 116 may also provide the capability to compress and uncompress voice traffic according to standard VoIP algorithms. Device 100 may support a mixture of both analog and/or digital PSTN voice connections with compression to a maximum of a predefined number of analog voice ports and/or digital (T1/E1) trunks per unit, with an overall maximum of voice, facsimile and/or data (DS0) circuits per unit. Analog voice ports may be configured for connection to a local PBX or to telephone handsets, facsimile or dial modems. The computer platform 116 may provide device 100 queue buffer, jitter buffer and/or echo cancellation mechanisms deployed to maintain quality over circuits with long and/or varying delays such as, e.g., but not limited to wireless, multiple, and/or satellite hops.

In an exemplary embodiment, computer platform 116 may provide, device 100 PSTN IP Gateway with Packet Switching capability via exemplary gateway and/or switching algorithms, etc. As interoperability is provided, device 100 may conform to, e.g., but not limited to, H.323 v2 and SIP (including B2BUA), enabling integration with soft switches and/or PC-based telephony. Device 100 may provide comprehensive gateway functions that may allow interfacing between different network services and types. For example, device 100 may interface to Voice over IP ("VoIP") networks, compress voice traffic over satellite or wireless connections, may simultaneously reduce the bandwidth used by a factor, and/or reduce the number of IP packets transmitted by a factor.

In an exemplary embodiment, computer platform 116 may provide device 100 with algorithms to, e.g., but not limited to receive incoming PSTN-compatible audio frequency signals; digitize said incoming audio signals; accumulate said digitized audio signals; compress said accumulated digitized audio signals using preprogrammed rules; transmit said compressed audio signals according to preprogrammed rules using a data link protocol optimized for the transmission of analog communications over a LTE wireless packet network. Said preprogrammed rules to be configured in the unit and/or learned by the unit. These embodiments, described in greater detail below, may incorporate analog audio communications algorithms. In one or more such embodiments, analog based communications may be provided over exemplary LTE wireless packet data network links.

In an exemplary embodiment, computer platform 116 may provide device 100 with the ability to provide secure communications between platforms, using, for example, the processes of digital encryption, digital authentication, and/or digital key exchange, among others.

Figure 2:
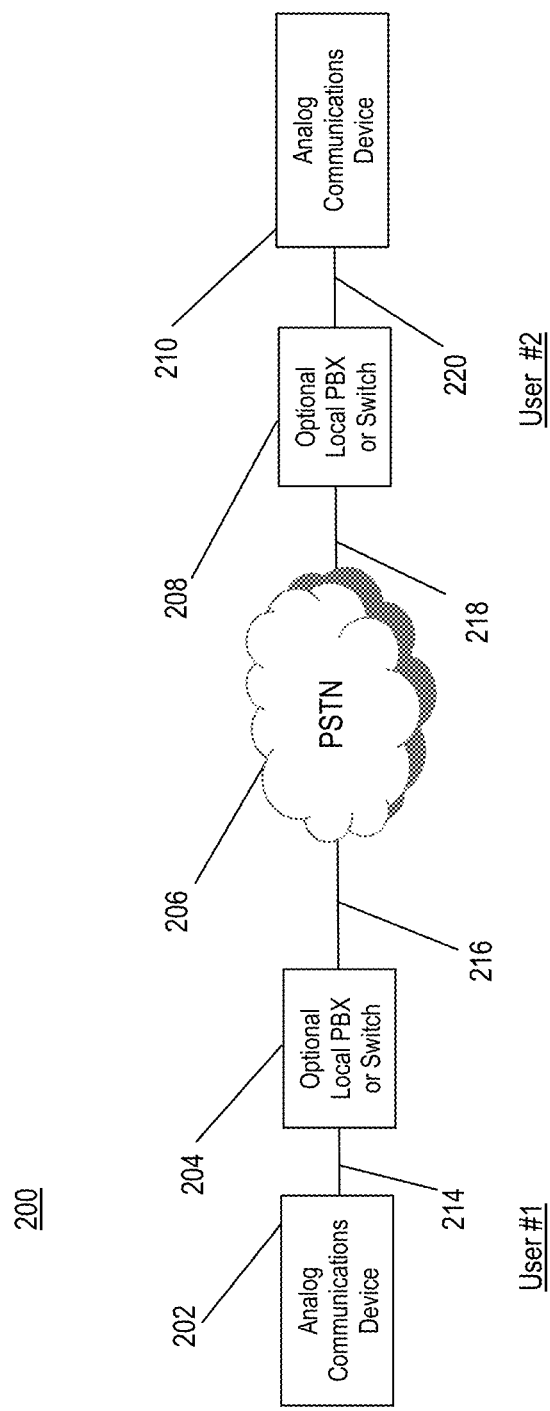
FIG. 2 illustrates an exemplary analog communications device, telephone, fax machine or dial modem connected to an optional local switch or PBX system which is connected to or coupled across the PSTN with an exemplary, second optional switch or PBX system connected to a second analog communications device, telephone, fax machine or dial modem, e.g., dial telephones connected to or coupled to the Public Switched Telephone Network (PSTN) in accordance with the present embodiments.

FIG. 2 illustrates an exemplary analog telephone system 200 with exemplary analog communications device 202 connected to or coupled with a second analog communications device 210 using the PSTN 206. As shown, analog communications device 202 is linked to the PSTN 206 via an optional PBX or switch 204, and analog communications device 210 is linked to the PSTN 206 via an optional PBX or switch 208.

In the illustrated exemplary embodiment, there may be one or more analog communications devices 202 and one or more connections 214, which may connect to or be coupled with one or more standard analog telephone lines 216 so that the optional local PBX or switch 204 may support multiple simultaneous calls.

In the illustrated exemplary embodiment, there may be one or more analog communications devices 210 and one or more connections 220, which may connect to or be coupled with one or more standard analog telephone lines 218 so that the optional local PBX or switch 208 may support multiple simultaneous calls.

In the illustrated exemplary embodiment, the analog communications devices 202 and 210 may connect to or coupled with the PSTN 206 using multiple individual serial connections couplings 214, 216, 218, 220 or using a shared digital connection such as T1/E1, which may also include an exemplary standards-compliant clock regeneration and/or jitter buffering to synchronize remote locations to an exemplary central network.

In the exemplary embodiments the analog communications devices 202, 210 may connect to or be coupled through the optional local PBX or switches 204, 208 to the PSTN 206 in real time using standard facsimile, dial modem or other tone based protocols. The direct connection provided by the PSTN 206 may provide uninterrupted communication during the period of the call that may allow the devices 202, 210 to synchronize and/or communicate continuously for the duration of the call. In other exemplary embodiments, alternative communications networks may provide real time, uninterrupted communication, such as e.g., but not limited to, some satellite and/or some circuit switched wireless networks as may be an operable alternative to the PSTN 206.

In another exemplary embodiment, a Very Small Aperture Terminal (VSAT) may provide a dedicated bandwidth link for the duration of an exemplary call and may allow analog communications devices to communicate successfully. VSAT terminals may include two-way satellite ground stations with an exemplary dish antenna typically smaller than 3 meters. VSATs may typically access satellites in geosynchronous orbit to relay data from small remote earth stations called terminals to other terminals in typically mesh configurations or master earth station hubs in star configurations. VSAT data rates may range from about narrowband up to approximately 4 Mbit/s. As used herein, the VSAT may share bandwidth in a time division mode. Demand assigned multiple access (DAMA) transmission may be used for an exemplary circuit-switched connection, wherein each user is permitted a slot of time on a demand (or request) basis.

In another exemplary embodiment, single channel per carrier/multiple channel per carrier (SCPC/MCPC) protocol transmission may be used. In exemplary embodiments, SCPC/MCPC may provide dedicated satellite link between a few distinct locations, where the links support either a single telephone line or several telephone or data lines. The links may, for example, be permanently assigned with no carrier switching or rerouting over the satellite.

In another embodiment, a circuit switched data connection or coupling over e.g., a cellular circuit switched wireless network may provide a dedicated bandwidth link for the duration of a call and may allow analog communications devices to communicate successfully.

Figure 3:
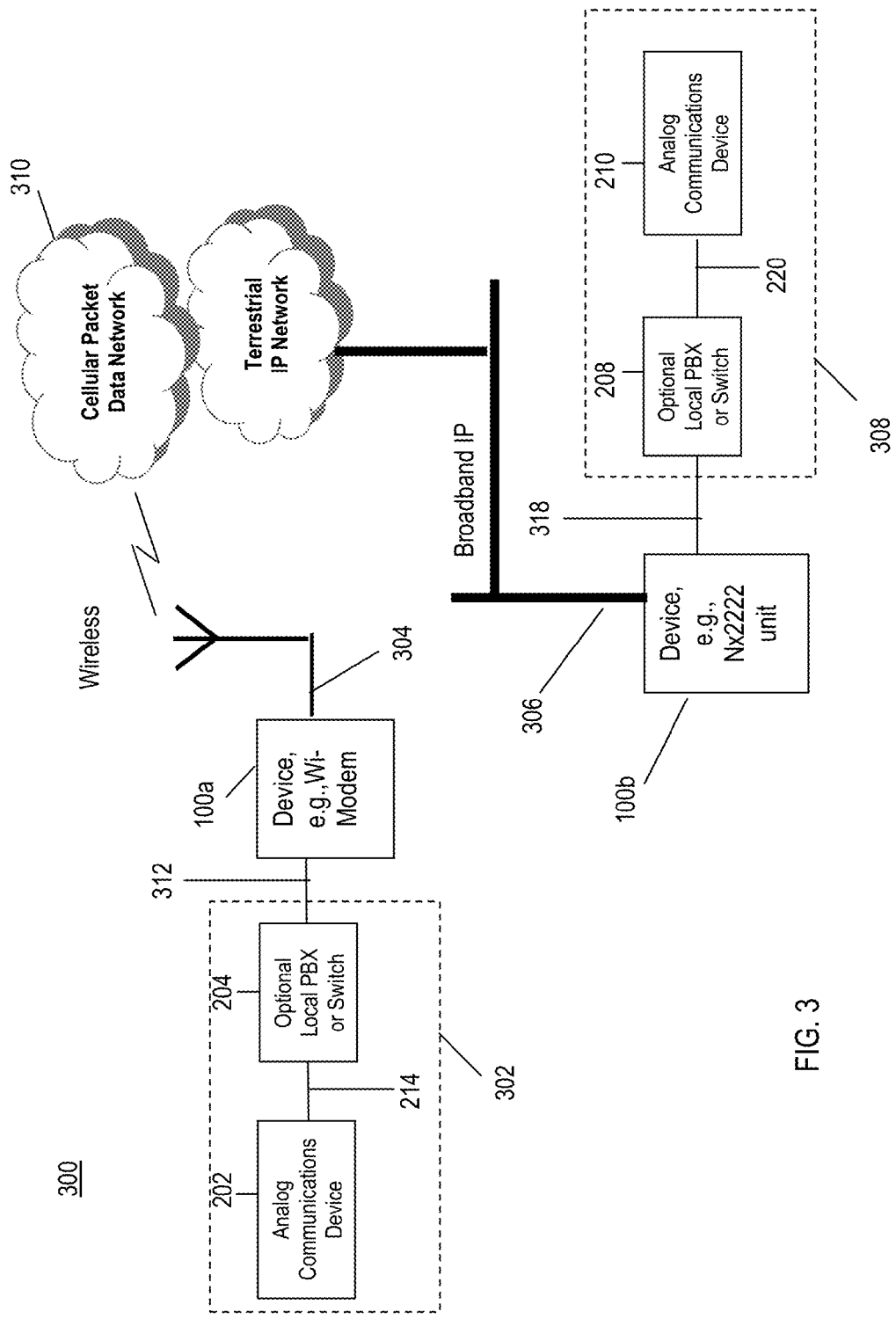
FIG. 3 illustrates an exemplary analog communications device connected to or coupled to a second exemplary analog communications device, using an exemplary LTE wireless packet data network in accordance with various exemplary embodiments.

FIG. 3 illustrates an exemplary analog communication over a wireless packet based data network 300 in accordance with the present exemplary embodiments. Environment 300 may include the foregoing analog telephone system 200 with an exemplary cellular wireless IP data packet network replacing the PSTN 206. Environment 300 also illustrates an exemplary device 100a (left side) connected or coupled to an analog communications system 302, and another exemplary device 100b (right side) connected or coupled to analog communications system 308.

In an exemplary embodiment, a connection or coupling may exist between the exemplary devices 100a, 100b and the analog communications devices 202, 210, which may employ any known telecommunications link. In an exemplary embodiment, link 312 and link 318 may each be either a single analog line or a TDM based trunk type, such as T1 or E1, and each of 312 and 318 may be across any combination of telecommunications equipment.

In an exemplary embodiment, a network connection may exist between the exemplary devices 100, which may employ in part any known protocol over any known telecommunications network. In an exemplary embodiment, any of links 304, 306, for example, may provide IP based connections or couplings over, e.g., but not limited to, an exemplary data network 310 such as, e.g., a cellular wireless, satellite or terrestrial IP data network.

In exemplary embodiments, analog communication may be transmitted from the analog communications device 202 circuits of exemplary network 214, across link 312 to exemplary device 100a. Here, in exemplary device 100a the analog transmission may be digitized and accumulated, processed according to the current invention and transmitted over network links 304 and 306 to the second exemplary device 100b. Symbols received by the second exemplary device 100b may be converted into analog audio for transmission to the exemplary analog communications device 210 over networks 318 and 220 of telecommunications system 308. In exemplary embodiment 300, the link 318 between exemplary device 100b and the telecommunications system 308, may be a digital T1/E1 connection capable of supporting multiple simultaneous calls, or a single analog connection, which persons skilled in the art will recognize as being functionally equivalent for the current purpose.

In exemplary embodiments, analog communication may be transmitted from the analog communications device 210 of telecommunication system 308, across link 318 to exemplary device 100b. Here, in exemplary device 100b the analog signal may be digitized and accumulated, processed and transmitted over network links 306 and 304 to the exemplary device 100a connected or coupled to the telecommunication system 302. Symbols received by this exemplary device 100a may be converted into analog signals for transmission over link 312 to the exemplary analog communications device 202 of the telecommunication system 302.

As understood by skilled persons, networks 304 and 306 may also respectively represent portions of the same cellular wireless network or any other known data network. For example the devices may also be connected or coupled via an IP cable network, an X.25 or Frame Relay data packet network, or VSAT terminals (not shown) or other satellite communications enabling devices, etc. In exemplary embodiments, the respective VSAT uplink downlink may be connected over DAMA, SCPC, MCPC or other enabling protocols for transmission.

Figure 5:
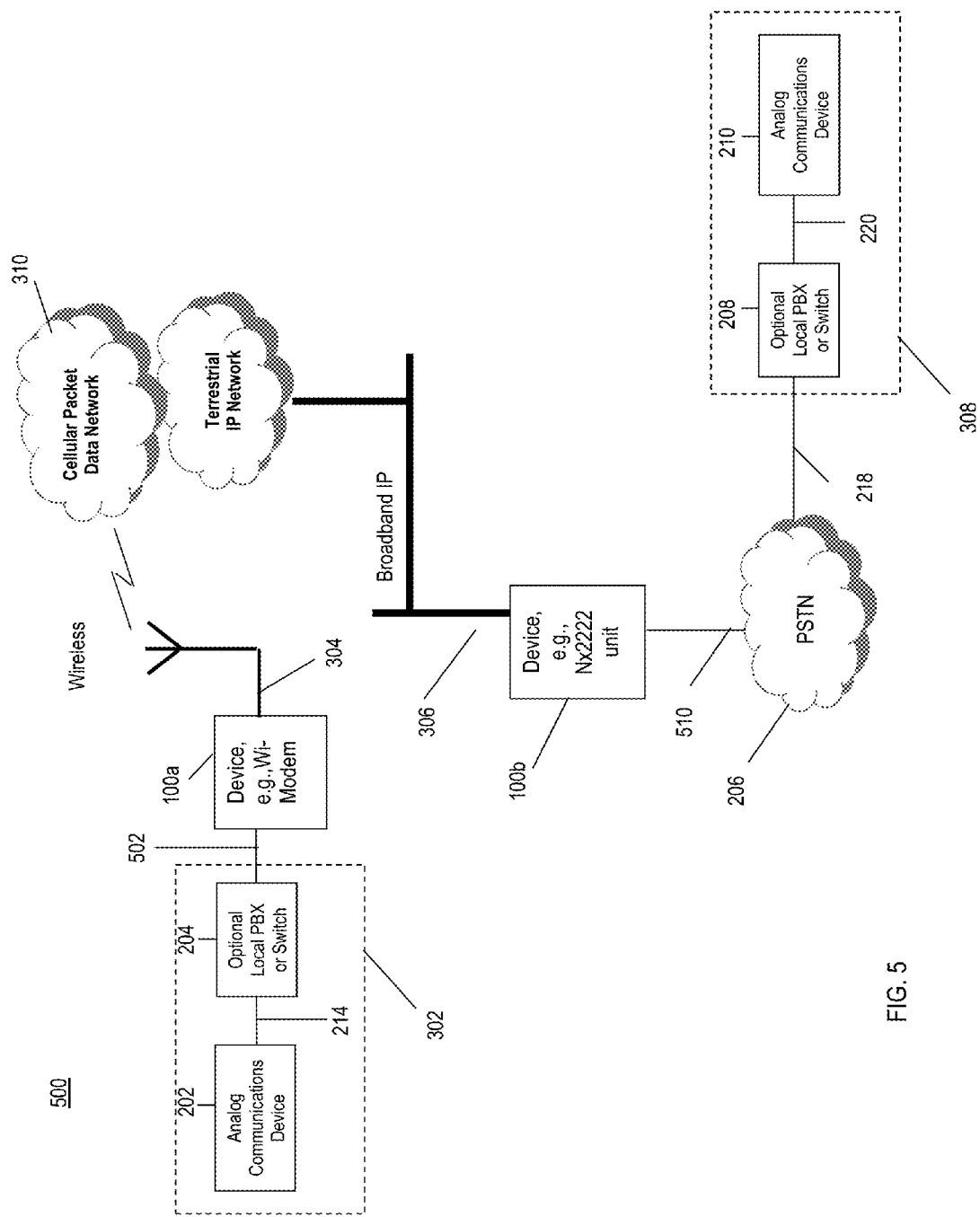
FIG. 5 illustrates an exemplary analog communications device connected to or coupled with an exemplary second analog communications device, the coupling of which may be through both a wireless packet data network and a PSTN switch in accordance with the various exemplary embodiments.

FIG. 5 illustrates an alternative exemplary embodiment 500 of analog communication over a wireless packet based data network connecting to or coupling with the PSTN in accordance with the present invention. Environment 500 includes the foregoing telecommunication system 308 connected to or coupled through the PTSN 206 to exemplary device 100b.

In an exemplary embodiment, a connection or coupling may exist between the exemplary devices, 100a and 100b and the analog communications devices 202 and 210, which may employ any known telecommunications link. In an exemplary embodiment, link 502 and link 510 may each be either a single analog line or a TDM based trunk type, such as T1 or E1, and each of 502 and 510 may be across any combination of telecommunications equipment.

Figure 6:
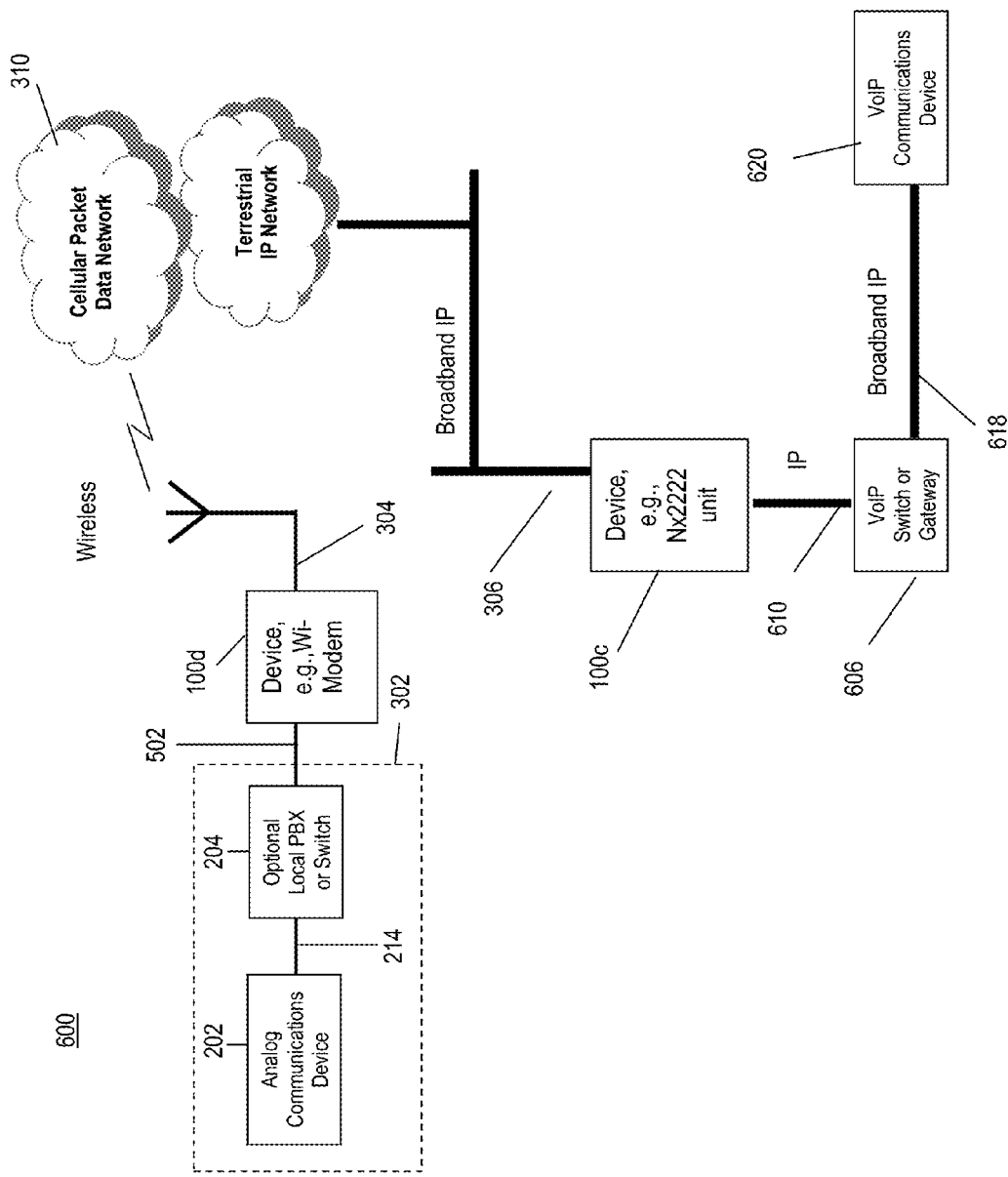
FIG. 6 illustrates an exemplary analog communications device connected to or coupled with an exemplary VoIP communications device, the coupling of which may be through both a wireless packet data network and a VoIP switch or VoIP gateway in accordance with the various exemplary embodiments.

FIG. 6 illustrates an alternative exemplary embodiment 600 of analog communication over a wireless packet based data network connecting to or coupling with a VoIP communications device. Environment 600 includes the foregoing telecommunication system 302 connected to or coupled through exemplary devices 100d and 100c to a VoIP communications device 620 which may be connected to exemplary device 100c through a VoIP switch or gateway 606.

In an exemplary embodiment, a connection or coupling may exist between the exemplary device 100c and the VoIP communications device 620, which may employ any known telecommunications link. In an exemplary embodiment, link 610 may be either a single analog line or a TDM based trunk type, such as T1 or E1, or any type of IP connection. In an exemplary embodiment, links 618 610, and 502 may be across any combination of telecommunications equipment.

As understood by skilled persons, networks 306, 610 and 618 may also represent portions of the same IP data network or a cellular wireless data network or any other known data network.

In an alternative exemplary embodiment, VoIP switch or gateway 606 may be combined with exemplary device 100c such that connection 610 is internal to exemplary device 100c and VoIP communications device 620 connects to or is coupled directly with exemplary device 100c though link 618. A connection or coupling may exist between the exemplary device 100c and the VoIP communications device 620, which may employ any known telecommunications link. In an exemplary embodiment, link 618 may be across any combination of telecommunications equipment.

In an exemplary embodiment, a network connection or coupling may exist between the VoIP communications device 620 and exemplary device 100c, which may employ any known protocol over any known telecommunications network. In an exemplary embodiment, any of links 610, 618, for example, may provide IP based connections or a single analog line or a TDM based trunk type, such as T1 or E1. A gateway 606 may provide connection or coupling for converting VoIP to a PSTN compatible communications signal.

In exemplary embodiments, analog communications signals may be transmitted from the telecommunications system of exemplary network 302, across link 502 to the exemplary device 100d. Here, in exemplary device 100d the analog communications signals may be digitized and converted to VoIP data packets and may be compressed using any known VoIP compression algorithm. The VoIP transmission may be accumulated and processed according to the current invention and transmitted over a wireless data network via links 304, and 306 to the exemplary device 100c. The symbols received by exemplary device 100c may be processed and converted to VoIP packets for transmission to the VoIP communications device 620 over links 610 and 618.

In exemplary embodiments, analog communications signals may be transmitted as VoIP packets from the VoIP communications device 620, across links 618 and 610 to exemplary device 100c. The VoIP packets may contain compressed audio compressed by the VoIP communications device 620 using any known VoIP compression algorithm. Here, in exemplary device 100c the VoIP packets may be received, accumulated, and processed according to the current invention, and transmitted over a wireless data network to exemplary device 100d. In exemplary device 100d the received symbols may be processed according to the current invention, decompressed according to any known VoIP compression algorithm used by VoIP communications device 620 and transmitted to the telecommunications system of exemplary network 302, across link 502.

Figure 7:
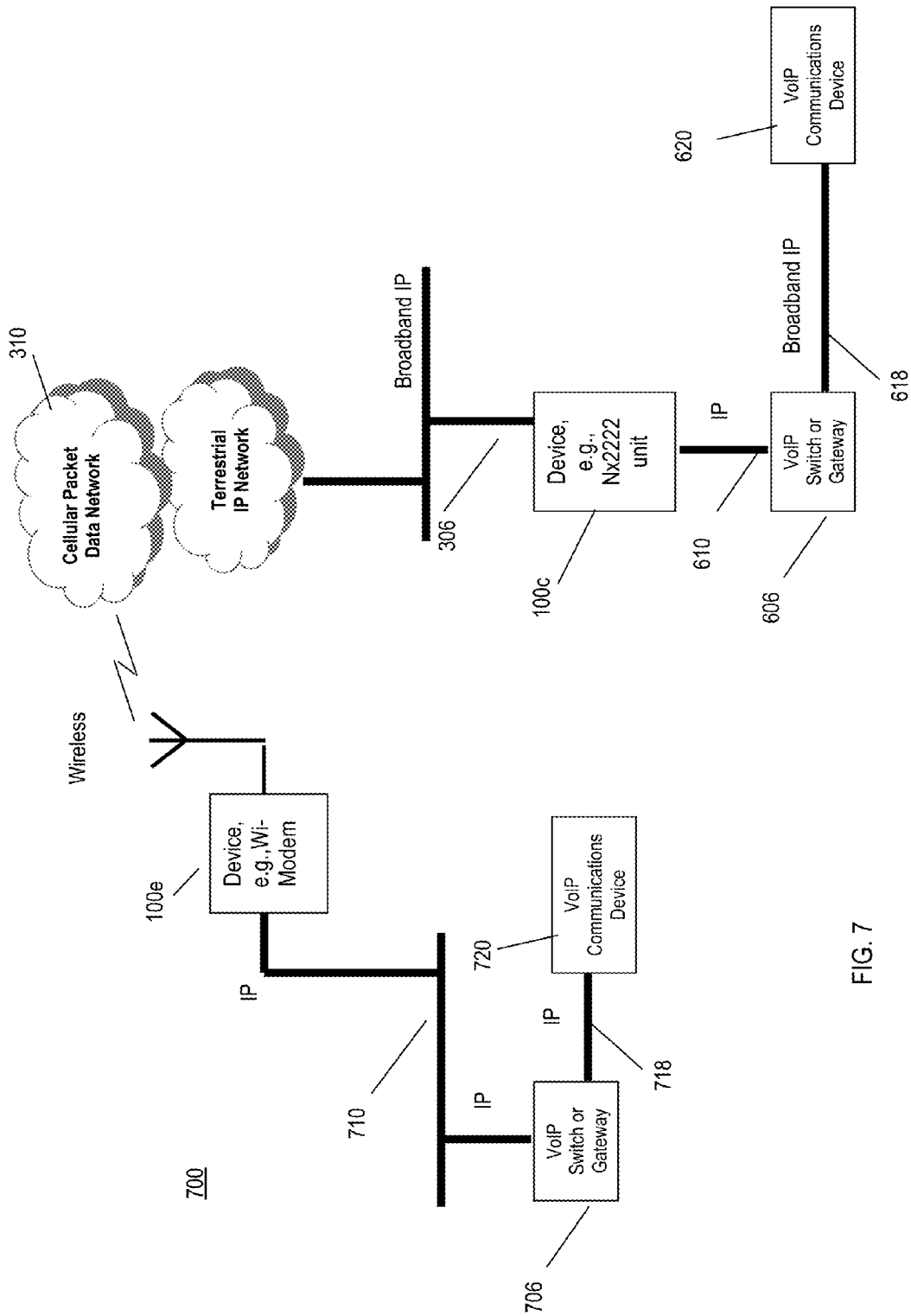
FIG. 7 illustrates an exemplary VoIP communications device connected to or coupled with an exemplary second VoIP communications device, the coupling of which may be through both a wireless packet data network and VoIP switches or VoIP gateways in accordance with the various exemplary embodiments.

FIG. 7 illustrates an alternative exemplary embodiment 700 of VoIP communications device 720 coupled to another VoIP communications devices 620 over a wireless data network through exemplary devices 100e and 100c which may be connected to exemplary devices 720 and 620 through VoIP switches or gateways 706 and 606 respectively.

In an exemplary embodiment, a connection or coupling may exist between the exemplary devices 100c and 100e and the VoIP communications devices 620 and 720, which may employ any known telecommunications links In an exemplary embodiment, links 610 and 710 may be either a single analog line or a TDM based trunk type, such as T1 or E1, or any type of IP connection. In an exemplary embodiment, links 618 610, 710 and 718 may be across any combination of telecommunications equipment.

As understood by skilled persons, networks 710 and 718 may also represent portions of the same IP data network or a cellular wireless data network or any other known data network.

In an alternative exemplary embodiment, VoIP switch or gateway 706 may be combined with exemplary device 100e such that connection 710 is internal to exemplary device 100e and VoIP communications device 720 connects to or is coupled directly with exemplary device 100e though link 718. A connection or coupling may exist between the exemplary device 100e and the VoIP communications device 720, which may employ any known telecommunications link. In an exemplary embodiment, link 718 may be across any combination of telecommunications equipment.

In an exemplary embodiment, a network connection or coupling may exist between the VoIP communications device 720 and exemplary device 100e, which may employ any known protocol over any known telecommunications network. In an exemplary embodiment, any of links 710, 718, for example, may provide IP based connections or a single analog line or a TDM based trunk type, such as T1 or E1. A gateway 706 may provide connection or coupling for converting VoIP to a PSTN compatible communications signal.

In exemplary embodiments, analog communications signals may be transmitted as VoIP packets from the VoIP communications device 720, across links 718 and 710 to exemplary device 100e. The VoIP packets may contain compressed audio compressed by the VoIP communications device 620 using any known VoIP compression algorithm. Here, in exemplary device 100e the VoIP data packets may be received, accumulated, and processed according to the current invention, and transmitted over a wireless data network to exemplary device 100c. In exemplary device 100c the received symbols may be processed according to the current invention and converted to VoIP packets for transmission to the VoIP communications device 620 over links 610 and 618.

In exemplary embodiments, analog communications signals may be transmitted as VoIP packets from the VoIP communications device 620, across links 618 and 610 to exemplary device 100c. The VoIP packets may contain compressed audio compressed by the VoIP communications device 620 using any known VoIP compression algorithm. Here, in exemplary device 100c the VoIP packets may be received, accumulated, and processed according to the current invention, and transmitted over a wireless data network to exemplary device 100e. In exemplary device 100e the received symbols may be processed according to the current invention and converted to VoIP packets for transmission to the VoIP communications device 720 over links 710 and 718.

Figure 8A:
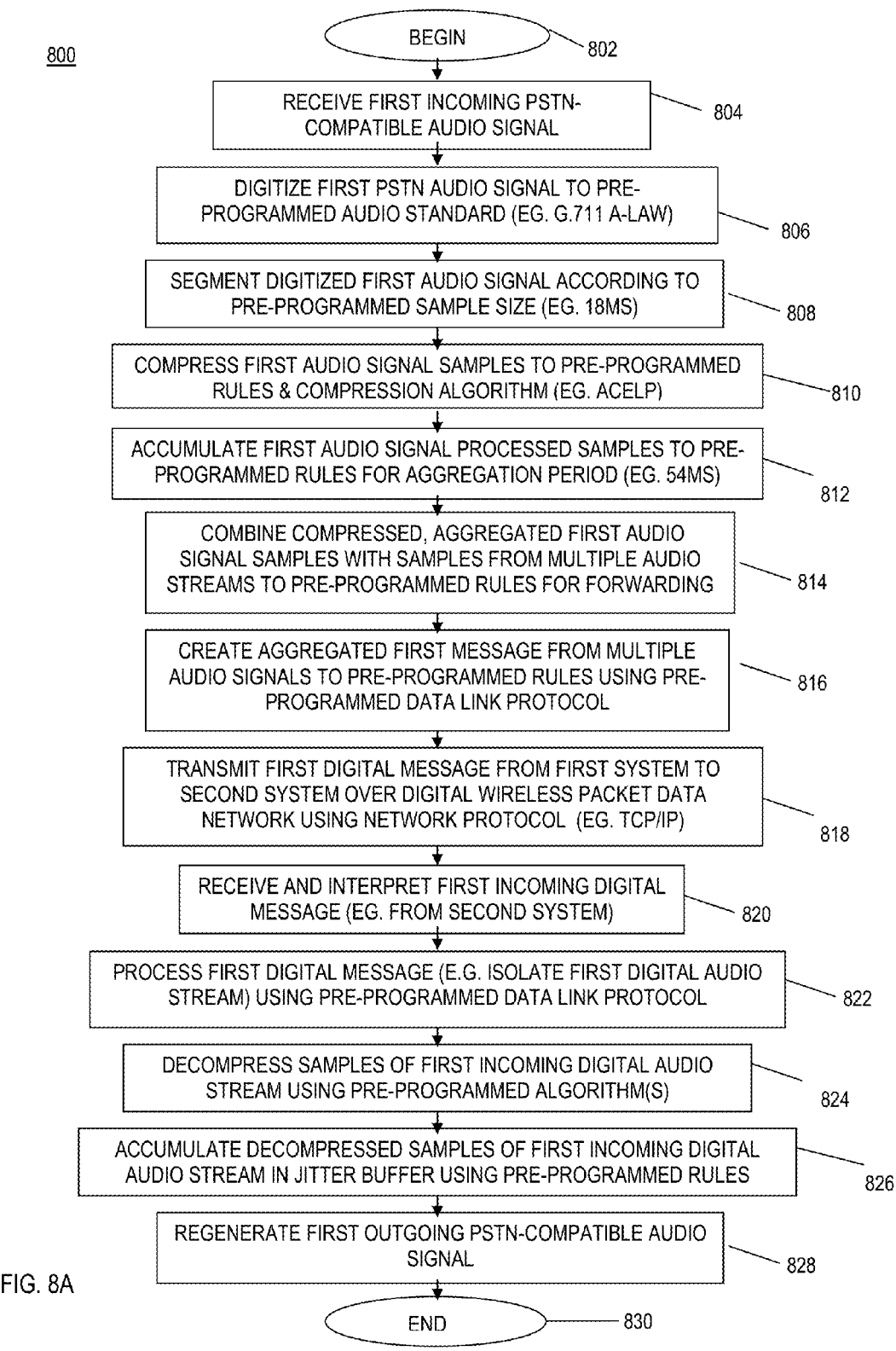
FIG. 8A depicts an exemplary flow diagram, according to an exemplary embodiment of an exemplary first system, in accordance with an exemplary embodiment.

FIG. 8A depicts an exemplary flow diagram 800 which, according to an exemplary embodiment, may describe exemplary functionality as may be performed by an exemplary first system embodiment. According to other exemplary embodiments, alternative exemplary system(s) need not necessarily perform any or all of the elements of flow diagram 800 in any particular sequence, but rather may process any incoming and/or any outgoing, exemplary signal(s) and/or message(s), e.g., but not limited to, in parallel and/or in serial fashion, which may further include, e.g., but not limited to, one or more unidirectional and/or bidirectional transmission(s)/reception(s), in any of various well known manner(s), and/or indeed may include, e.g., but not limited to, a looping process of a stream of such signal(s) and/or message(s) which may include, e.g., but not limited to, from time to time, continually and/or in one or more burst(s), transfer, communication, and/or transmission to another subsystem of a same system, and/or to a different system over a communications link such as, e.g., but not limited to, a data network, etc. To be clear, reference herein to a first or second subsystem, and/or first or second signal(s) or message(s), do not imply any sequence, but are rather to distinguish between different and/or similar subsystems of one or more systems, or supersystems, according to various exemplary but nonlimiting embodiments. Flow diagram 800, according to an exemplary embodiment may begin with 802 and may continue immediately with 804.

In 804, an exemplary first system may receive exemplary first incoming PSTN-compatible audio signal. From 804, flow diagram 800 may continue with 806.

In 806, the exemplary first system may process (e.g., digitize) the first incoming PSTN-compatible analog audio signal and generate a first digital audio stream which may comply to a pre-programmed audio standard such as, e.g. but not limited to G.711 A-Law or G.711 μ-Law. From 806, flow diagram 800 may continue with 808.

In 808, the exemplary first system may segment the said first digital audio stream according to one or more preprogrammed rule (s) to generate a sequence of samples of pre-programmed size. From 808, flow diagram 800 may continue with 810.

In 810, the exemplary first system may compress or not compress the said segmented first digital audio stream samples according to one or more preprogrammed rule(s), which may depend on, e.g., but not limited to the end-to-end throughput characteristics of the network, the number of simultaneous calls currently on progress, etc., using one of pre-programmed compression algorithms e.g., but not limited to any algorithm optimized for voice compression or silence suppression, to generate a sequence of processed samples. From 810, flow diagram 800 may continue with 812.

In 812, the exemplary first system may accumulate said first digital audio stream processed samples according to one or more preprogrammed rule(s), which may depend on, e.g., but not limited to the end-to-end throughput characteristics of the network, a pre-specified forwarding period, a pre-specified number of processed samples, the number of simultaneous calls currently on progress etc., to generate a first group of processed samples. From 812, flow diagram 800 may continue with 814.

In 814, the exemplary first system may combine said first group of processed samples from said first incoming PSTN compatible audio stream with groups of samples from other incoming PSTN compatible audio streams according to one or more preprogrammed rule(s), which may depend on, e.g. but not limited to, a pre-specified forwarding period, a packet throughput limit for the network, etc., to generate a first batch of processed samples to be transmitted. From 814, flow diagram 800 may continue with 816.

In 816, the exemplary first system may create a first digital message containing the said first batch of processed samples according to one or more preprogrammed rule(s), which may define, e.g. but not limited to a pre-specified data link protocol. From 816, flow diagram 800 may continue with 818.

In 818, the exemplary first system may create a first digital message in a single network compatible data packet or sequence of data packets containing the said single digital message according to one or more preprogrammed rule(s), for transmission across the network from the first system to the second system over a wireless packet data network which may define, e.g. but not limited to a pre-specified network protocol. From 818, flow diagram 800 may continue with 820.

In 820, an exemplary first system may receive and interpret first incoming digital messages e.g., from the exemplary second system. From 820, flow diagram 800 may continue with 822. Although not shown, it will be apparent to those skilled in the art that various steps of flow diagram 800, such as, e.g. but not limited to, 804 and 820 etc., may be performed in parallel, and continually, according to an alternative exemplary embodiment.

In 822, exemplary first incoming digital messages may be processed by the exemplary first system according to one or more preprogrammed rule(s), which may define, e.g. but not limited to a pre-specified data link protocol which may separate the contents of said first incoming digital message into independent digital audio streams. From 822, flow diagram 800 may continue with 824.

In 824, the exemplary first system may process any compressed digital audio stream samples according to one or more preprogrammed algorithms. From 824, flow diagram 800 may continue with 826.

In 826, the exemplary first system may accumulate said processed samples from said first incoming digital audio stream and store temporarily in a jitter buffer according to one or more preprogrammed rule(s), which may depend on, e.g., but not limited to the end-to-end jitter characteristics of the network. From 826, flow diagram 800 may continue with 828.

In 828, the exemplary first system may regenerate first outgoing PTSN compatible audio signals. From 828, flow diagram 800 may continue immediately to 830, where flow diagram 800 may end. In another exemplary embodiment, exemplary flow diagram 800 need not be in serial form, but may rather run 804, 806, 808, 810, 812, 814, 816 and 818, and in parallel, 820, 822, 824, 826, and 828, and may loop back continually to 804 and 820, respectively in an exemplary embodiment.

According to another exemplary embodiment, a second system may similarly perform the exemplary steps noted above with reference to FIG. 8A, communicating to an exemplary first system.

According to another exemplary embodiment, in addition to the exemplary first system according to FIG. 8A, the process may continue, e.g., with similar functionality by a second system in communication with the first system.

Figure 8B:
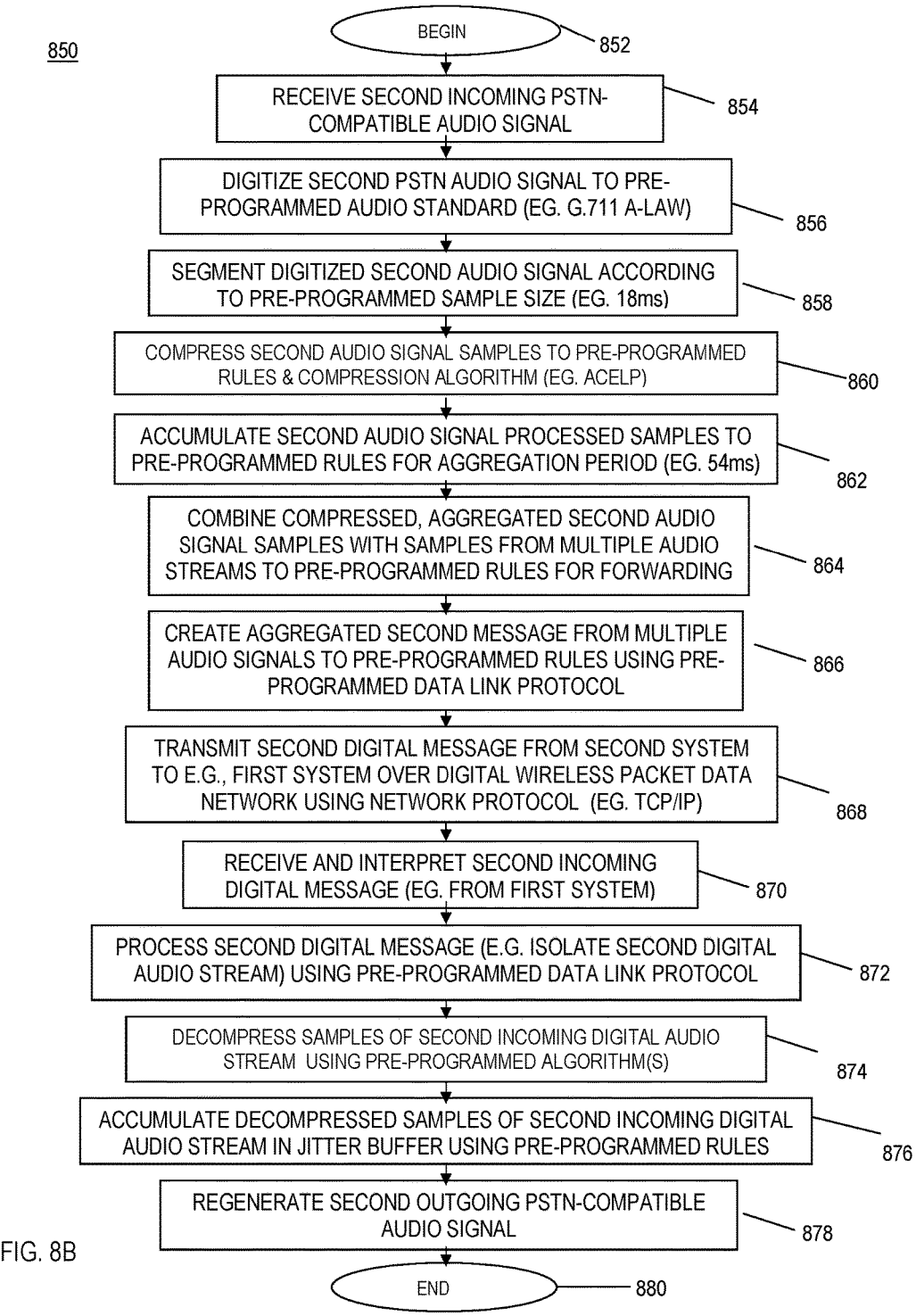
FIG. 8B depicts an exemplary flow diagram, according to an exemplary embodiment of an exemplary second system, in accordance with an exemplary embodiment.

FIG. 8B depicts an exemplary flow diagram 850, which, according to an exemplary embodiment, may describe exemplary functionality as may be performed by an exemplary second system exemplary embodiment. According to other exemplary embodiments, alternative exemplary system(s) need not necessarily perform any or all of the elements of flow diagram 850 in any particular sequence, but rather may process any incoming and/or any outgoing, exemplary signal(s) and/or message(s), e.g., but not limited to, in parallel and/or in serial fashion, which may further include, e.g., but not limited to, one or more unidirectional and/or bidirectional transmission(s)/reception(s), in any of various well known manner(s), and/or indeed may include, e.g., but not limited to, a looping process of a stream of such signal(s) and/or message(s) which may include, e.g., but not limited to, from time to time, continually and/or in one or more burst(s), transfer, communication, and/or transmission to another subsystem of a same system, and/or to a different system over a communications link such as, e.g., but not limited to, a data network, etc. To be clear, reference herein to a first or second subsystem, and/or first or second signal(s) or message(s), do not imply any sequence, but are rather to distinguish between different and/or similar subsystems of one or more systems, or supersystems, according to various exemplary but nonlimiting embodiments. Flow diagram 850, according to an exemplary embodiment may begin with 852 and may continue immediately with 854.

In 854, an exemplary second system may receive exemplary second incoming PSTN-compatible audio signal. From 854, flow diagram 850 may continue with 856.

In 856, the exemplary second system may process (e.g., digitize) the second incoming PSTN-compatible audio signal to generate a second digital audio stream which may comply to a pre-programmed audio standard such as, e.g. but not limited to G.711 A-Law or G.711 µ-Law. From 856, flow diagram 850 may continue with 858.

In 858, the exemplary second system may segment the said second digital audio stream according to one or more preprogrammed rule (s) to generate a sequence of samples of pre-programmed size. From 858, flow diagram 850 may continue with 860.

In 860, the exemplary second system may compress or not compress the said segmented second digital audio stream samples according to one or more preprogrammed rule(s), which may depend on, e.g., but not limited to, the end-to-end throughput characteristics of the network, the number of simultaneous calls currently on progress, etc., using one of pre-programmed compression algorithms e.g., but not limited to any algorithm optimized for voice compression or silence suppression, to generate a sequence of processed samples. From 860, flow diagram 850 may continue with 862.

In 862, the exemplary second system may accumulate said second digital audio stream processed samples according to one or more preprogrammed rule(s), which may depend on, e.g., but not limited to, the end-to-end throughput characteristics of the network, a pre-specified accumulation period, a pre-specified number of samples, the number of simultaneous calls currently on progress, etc., to generate a second group of processed samples. From 862, flow diagram 850 may continue with 864.

In 864, the exemplary second system may combine said second group of samples from said second incoming PSTN compatible audio stream with groups of samples from other incoming PSTN compatible audio signals according to one or more preprogrammed rule(s), which may depend on, e.g. but not limited to a pre-specified forwarding period, a packet throughput limit for the network, etc., to generate a second batch of processed samples to be transmitted. From 864, flow diagram 850 may continue with 866.

In 866, the exemplary second system may create a single digital message containing the said second batch of processed samples according to one or more preprogrammed rule(s), which may define, e.g. but not limited to a pre-specified data link protocol. From 866, flow diagram 850 may continue with 868.

In 868, the exemplary second system may create a second digital message in a single network compatible data packet or sequence of data packets containing the said second digital message according to one or more preprogrammed rule(s), for transmission across the network from the second system to, e.g., the first system, over a wireless packet data network which may define, e.g. but not limited to a pre-specified network protocol. From 868, flow diagram 850 may continue with 870.

In 870, an exemplary second system may receive and interpret second incoming digital messages e.g., from the exemplary first system. From 870, flow diagram 850 may continue with 872. Although not shown, it will be apparent to those skilled in the art that various steps of flow diagram 850, such as, e.g. but not limited to, 854 and 870 etc., may be performed in parallel, and continually, according to an alternative exemplary embodiment.

In 872, exemplary second incoming digital messages may be processed by the exemplary second system according to one or more preprogrammed rule(s), which may define, e.g. but not limited to a pre-specified data link protocol which may separate the contents of said second incoming digital message into independent digital audio streams. From 872, flow diagram 850 may continue with 874.

In 874, the exemplary second system may process any compressed digital audio stream samples according to one or more preprogrammed algorithms. From 874, flow diagram 850 may continue with 876.

In 876, the exemplary second system may accumulate processed samples from said second incoming digital audio stream and store temporarily in a jitter buffer according to one or more preprogrammed rule(s), which may depend on, e.g., but not limited to the end-to-end jitter characteristics of the network. From 876, flow diagram 850 may continue with 878.

In 878, the exemplary second system may regenerate second outgoing PTSN compatible audio signals. From 878, flow diagram 850 may continue immediately to 880, where flow diagram 850 may end. In another exemplary embodiment, exemplary flow diagram 850 need not be in serial form, but may rather run 854, 856, 858, 860, 862, 864, 866 and 868, and in parallel, 870, 872, 874, 876, and 878, and may loop back continually to 854 and 870, respectively in an exemplary embodiment.

Figure 9:
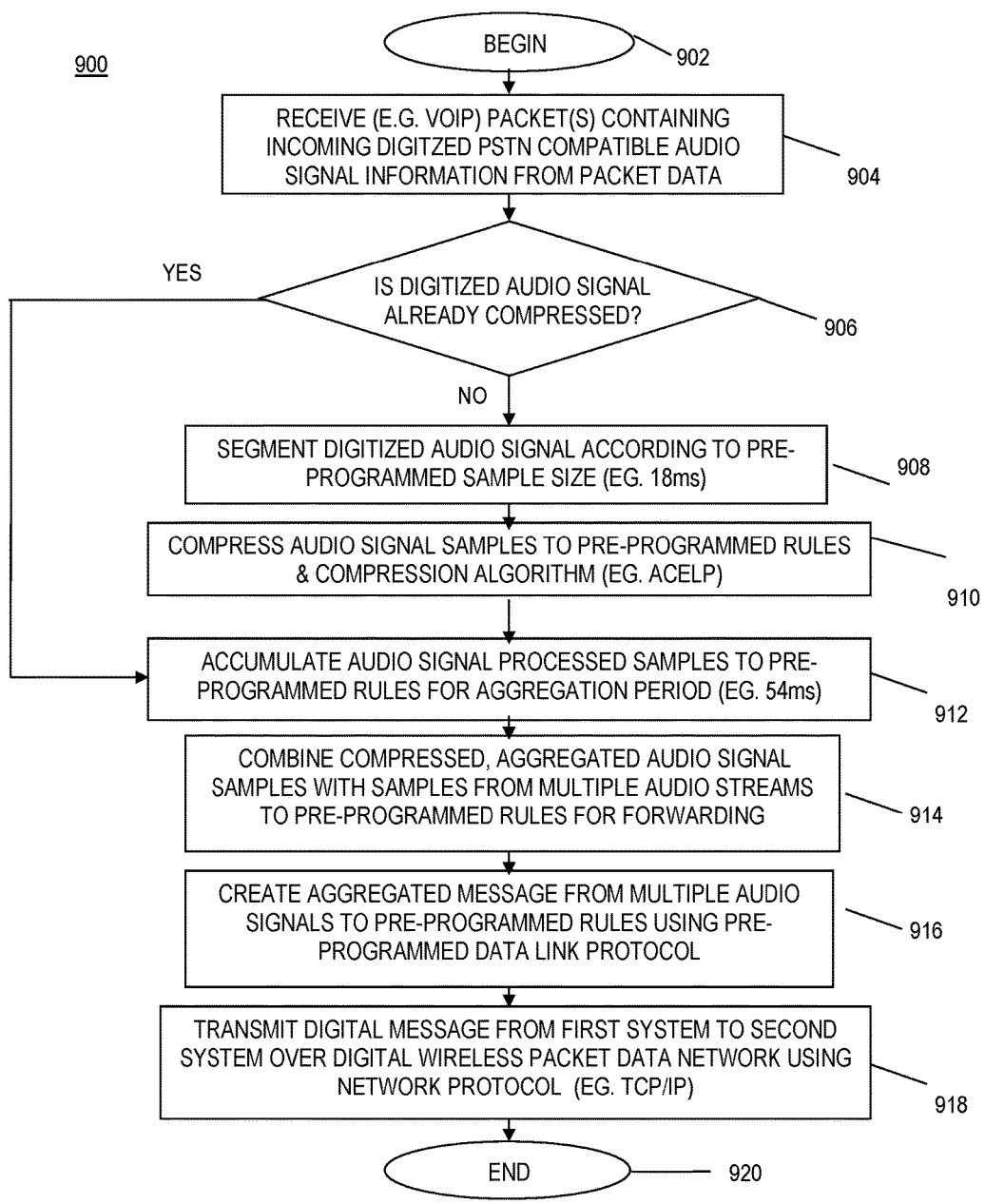
FIG. 9 depicts an exemplary flow diagram, according to an exemplary embodiment of another exemplary first system, in accordance with an exemplary embodiment.

FIG. 9 depicts an exemplary flow diagram 900, which, according to an exemplary embodiment, may describe exemplary functionality as may be performed by an exemplary combination system, which may refer to a first system, a second system, or one or more systems, subsystems and/or supersystems, according to various exemplary embodiments. According to other exemplary embodiments, alternative exemplary system(s) need not necessarily perform any or all of the elements of flow diagram 900 in any particular sequence, but rather may process any incoming and/or any outgoing, exemplary signal(s) and/or message(s), e.g., but not limited to, in parallel and/or in serial fashion, which may further include, e.g., but not limited to, one or more unidirectional and/or bidirectional transmission(s)/reception(s), in any of various well known manner(s), and/or indeed may include, e.g., but not limited to, a looping process of a stream of such signal(s) and/or message(s) which may include, e.g., but not limited to, from time to time, continually and/or in one or more burst(s), transfer, communication, and/or transmission to another subsystem of a same system, and/or to a different system over a communications link such as, e.g., but not limited to, a data network, etc. To be clear, reference herein to a first or second subsystem, and/or first or second signal(s) or message(s), do not imply any sequence, but are rather to distinguish between different and/or similar subsystems of one or more systems, or supersystems, according to various exemplary but nonlimiting embodiments.

Flow diagram 900, according to an exemplary embodiment may begin with 902 and may continue immediately with 904.

In 904, an exemplary first system may receive an exemplary packet and/or packets, which may contain first incoming PSTN compatible audio signal information, the packets received from a packet data network of any of several well known types including, e.g., but not limited to, terrestrial, satellite, optical, wireless, and/or wireline, etc. From 904, flow diagram 900 may continue with 906. PSTN compatible audio frequency signal information may be in a VoIP packet, and may already be compressed, etc.

In 906, the exemplary first system may interpret the first incoming PSTN compatible audio signal information according to a message protocol being used, e.g., but not limited to, any VoIP compression algorithm. From 906, if the first incoming PSTN compatible audio signal information is not compressed the flow diagram 900 may continue with 908. From 906, if the first incoming PSTN compatible audio signal information is already compressed the flow diagram 900 may continue with 912. Although not shown, it will be apparent to those skilled in the art that in an alternative embodiment an additional link between 906 and 908 may be added to decompress a first incoming PSTN compatible audio signal that is already compressed.

In 908, the exemplary first system may segment the said first incoming PSTN compatible uncompressed audio signal information according to one or more preprogrammed rule (s) to generate a sequence of samples of pre-programmed size. From 908, flow diagram 900 may continue with 910.

In 910, the exemplary first system may compress or not compress the said segmented first digital audio stream samples according to one or more preprogrammed rule(s), which may depend on, e.g., but not limited to, the end-to-end throughput characteristics of the network, the number of simultaneous calls currently on progress, etc., using one of pre-programmed compression algorithms e.g., but not limited to any algorithm optimized for voice compression or silence suppression, to generate a sequence of processed samples. From 910, flow diagram 900 may continue with 912.

In 912, the exemplary first system may accumulate said first digital audio stream processed samples according to one or more preprogrammed rule(s), which may depend on, e.g., but not limited to, the end-to-end throughput characteristics of the network, a pre-specified accumulation period, a pre-specified number of samples, the number of simultaneous calls currently on progress, etc., to generate a first group of processed samples. From 912, flow diagram 900 may continue with 914.

In 914, the exemplary first system may combine said first group of accumulated samples from said first incoming PSTN compatible audio signal with groups of samples from other incoming PSTN compatible audio signals according to one or more preprogrammed rule(s), which may depend on, e.g. but not limited to a pre-specified forwarding period, a packet throughput limit for the network, etc., to generate a first batch of processed samples to be transmitted. From 914, flow diagram 900 may continue with 916.

In 916, the exemplary first system may create a first digital message containing the said first batch of processed samples according to one or more preprogrammed rule(s), which may define, e.g. but not limited to a pre-specified data link protocol. From 916, flow diagram 900 may continue with 918.

In 918, the exemplary first system may create a first digital message in a single network compatible data packet or sequence of data packets containing the said single digital message according to one or more preprogrammed rule(s), for transmission across the network from the first system to the second system over a wireless packet data network which may define, e.g. but not limited to a pre-specified network protocol. From 918, flow diagram 900 may continue immediately to 930, where flow diagram 900 may end. In another exemplary embodiment, exemplary flow diagram 900 need not be in serial form, but may rather run 904, 906, 908, 910, 912, 914, 916 and 918 in parallel, and may loop back continually to 904 in an exemplary embodiment.

Figure 10:
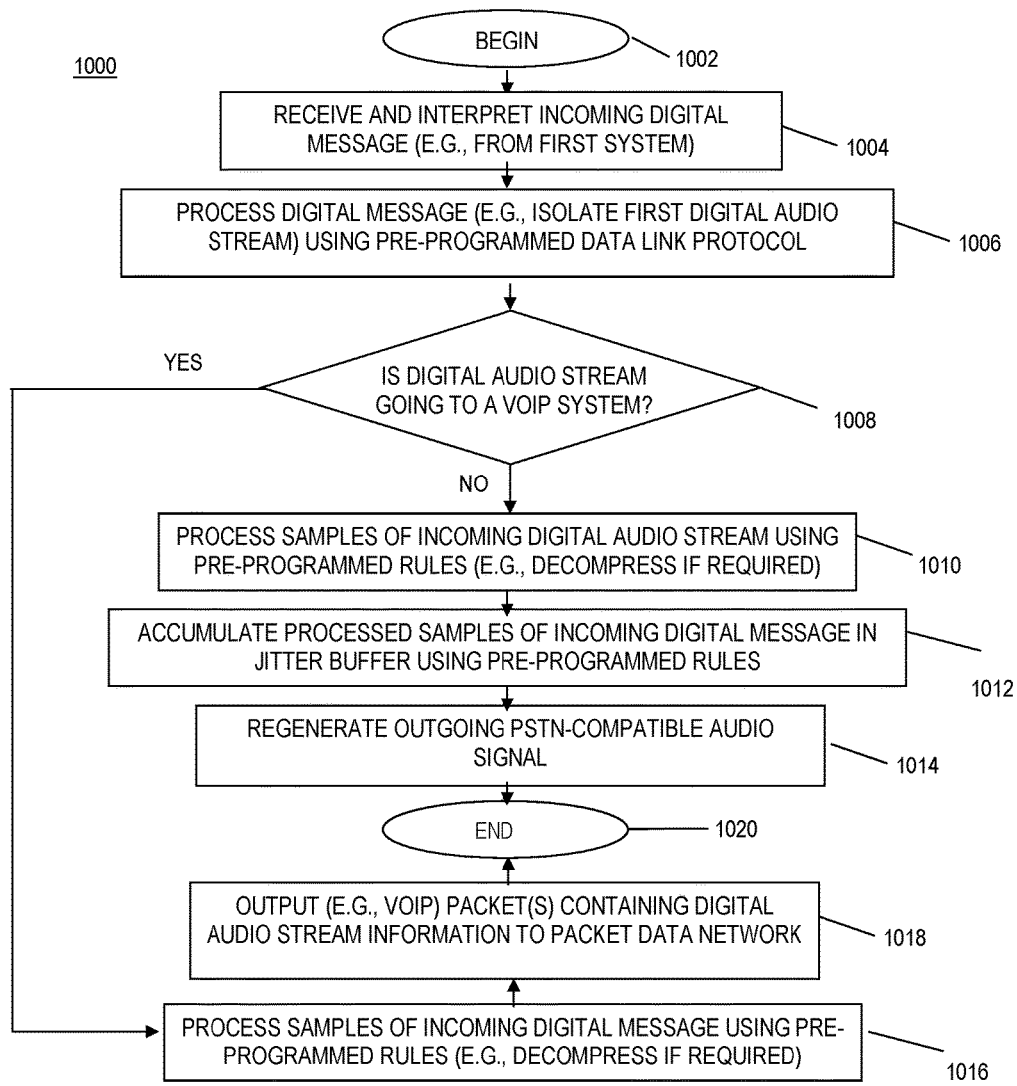
FIG. 10 depicts an exemplary flow diagram, according to an exemplary embodiment of another exemplary second system, in accordance with an exemplary embodiment.

According to another exemplary embodiment, in addition to the exemplary first system according to FIG. 9, the process may continue, e.g., with similar functionality by a second system in communication with the first system such as, e.g., but not limited to, the flow diagram of FIG. 10.

FIG. 10 depicts an exemplary flow diagram 1000, which, according to an exemplary embodiment, may describe exemplary functionality as may be performed by an exemplary combination system, which may refer to a first system, a second system, or one or more systems, subsystems and/or supersystems, according to various exemplary embodiments. According to other exemplary embodiments, alternative exemplary system(s) need not necessarily perform any or all of the elements of flow diagram 1000 in any particular sequence, but rather may process any incoming and/or any outgoing, exemplary signal(s) and/or message(s), e.g., but not limited to, in parallel and/or in serial fashion, which may further include, e.g., but not limited to, one or more unidirectional and/or bidirectional transmission(s)/reception(s), in any of various well known manner(s), and/or indeed may include, e.g., but not limited to, a looping process of a stream of such signal(s) and/or message(s) which may include, e.g., but not limited to, from time to time, continually and/or in one or more burst(s), transfer, communication, and/or transmission to another subsystem of a same system, and/or to a different system over a communications link such as, e.g., but not limited to, a data network, etc. To be clear, reference herein to a first or second subsystem, and/or first or second signal(s) or message(s), do not imply any sequence, but are rather to distinguish between different and/or similar subsystems of one or more systems, or supersystems, according to various exemplary but nonlimiting embodiments.

Flow diagram 1000, according to an exemplary embodiment may begin with 1002 and may continue immediately with 1004.

In 1004, an exemplary second system may receive and interpret first incoming digital messages e.g., from the exemplary first system. From 1004, flow diagram 1000 may continue with 1006.

In 1006, exemplary first incoming digital messages may be processed by the exemplary second system according to one or more preprogrammed rule(s), which may define, e.g. but not limited to a pre-specified data link protocol which may separate the contents of said first incoming digital message into independent digital audio streams. From 1006, flow diagram 1000 may continue with 1008.

In 1008, the exemplary second system may interpret the first incoming digital audio stream according to a message protocol being used, e.g., but not limited to, any VoIP system or algorithm. From 1008, if the first incoming PSTN compatible audio stream is not coupled with or connected to a VoIP system the flow diagram 1000 may continue with 1010. From 1008, if the first incoming digital audio stream is coupled with or connected to a VoIP system the flow diagram 1000 may continue with 1016.

In 1010, the exemplary second system may process which may include, e.g., but not limited to decompress the digital audio stream samples according to one or more preprogrammed rules. From 1010, flow diagram 1000 may continue with 1012.

In 1012, the exemplary second system may accumulate processed samples from said second incoming digital audio stream and store temporarily in a jitter buffer according to one or more preprogrammed rule(s), which may depend on, e.g., but not limited to the end-to-end jitter characteristics of the network. From 1012 flow diagram 1000 may continue with 1014.

In 1014, the exemplary second system may regenerate second outgoing PTSN compatible audio signals. From 1014, flow diagram 1000 may continue immediately to 1020, where flow diagram 1000 may end. In another exemplary embodiment, exemplary flow diagram 1000 need not be in serial form, but may rather run 1004, 1004, 1006, followed by 1008, 1010, 1012, 1014, or 1016 and 1018, and may loop back continually to 1004 in an exemplary embodiment.

In 1016, the exemplary second system may process samples of the incoming PSTN compatible digital audio stream which may include, e.g., but not limited to decompress the digital audio stream samples according to one or more preprogrammed rules and which may provide functions to connect to or couple with a VoIP communications device or a VoIP gateway. From 1016, flow diagram 1000 may continue with 1018.

In 1018, the exemplary second system may transmit an exemplary packet and/or packets, which may contain first incoming PSTN compatible digital audio signal information in the form of e.g., VoIP packets, the packets transmitted to a packet data network of any of several well known types including, e.g., but not limited to, terrestrial, satellite, optical, wireless, and/or wireline, etc. From 1018, flow diagram 1000 may continue with 1020 or loop back to 1004.

According to another exemplary embodiment, in addition to the exemplary second system according to FIG. 10, the process may continue (or proceed in parallel), e.g., with similar functionality by a second system in communication with the first system such as, e.g., but not limited to, the flow diagram of FIG. 9.

Although certain exemplary embodiments may have the first and second exemplary systems arranged horizontally (i.e., forming a symmetric signal path as in FIG. 3 and FIG. 7), alternatively, in other exemplary embodiments, the first and second exemplary systems may be arranged vertically processing different types of exemplary traffic.

Specifically, in some exemplary embodiments (see, e.g., as illustrated in, FIG. 5) an exemplary system one may interface to the PSTN one end and may be coupled to a private branch exchange, key system or directly to an analog communications device on the other end, and then the system two may interface to a private branch exchange, key system or directly to an analog communications device one end and may be coupled to the PSTN on the other end.

In other exemplary embodiments (see, e.g., as illustrated in, FIG. 6) an exemplary system one may interface to a PSTN compatible system on one end and may be coupled to a data network on the other end, and then the system two may interface to the data network on one end and be coupled to the PSTN compatible system on the other end.

In other alternative exemplary embodiments, the first and second systems may be directly coupled to two separate wireless links, one or both of which may connect to a cellular packet data network.

In other alternative exemplary embodiments, the first and second systems may be simultaneously coupled with multiple other devices and may form a mesh network of connections of which at least one may be to a cellular packet data network.

Figure 11:
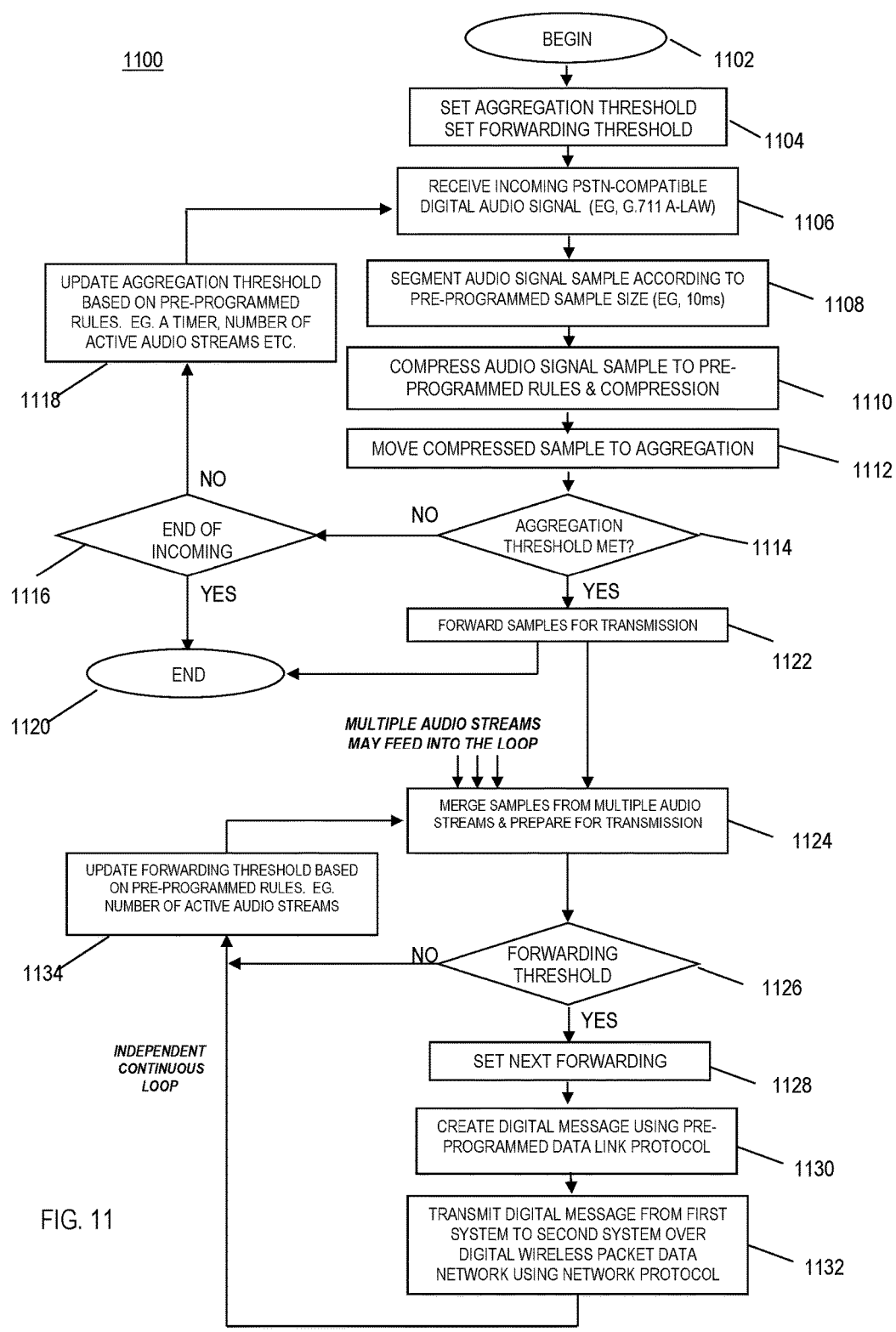
FIG. 11 depicts an exemplary flow diagram, according to an exemplary embodiment of yet another exemplary first system, in accordance with an exemplary embodiment.

FIG. 11 depicts an exemplary flow diagram 1100, which, according to an exemplary embodiment, may describe exemplary functionality as may be performed by an exemplary first system, or part of an exemplary combination system, which may refer to a first system, a second system, or one or more systems, subsystems and/or supersystems, according to various exemplary embodiments. According to other exemplary embodiments, alternative exemplary system(s) need not necessarily perform any or all of the elements of flow diagram 1100 in any particular sequence, but rather may process any incoming and/or any outgoing, exemplary signal(s) and/or message(s), e.g., but not limited to, in parallel and/or in serial fashion, which may further include, e.g., but not limited to, one or more unidirectional and/or bidirectional transmission(s)/reception(s), in any of various well known manner(s), and/or indeed may include, e.g., but not limited to, a looping process of a stream of such signal(s) and/or message(s) which may include, e.g., but not limited to, from time to time, continually and/or in one or more burst(s), transfer, communication, and/or transmission to another subsystem of a same system, and/or to a different system over a communications link such as, e.g., but not limited to, a data network, etc. To be clear, reference herein to a first or second subsystem, and/or first or second signal(s) or message(s), do not imply any sequence, but are rather to distinguish between different and/or similar subsystems of one or more systems, or supersystems, according to various exemplary but nonlimiting embodiments.

Flow diagram 1100, according to an exemplary embodiment may begin with 1102 and may continue immediately with 1104.

In 1104, as illustrated in flow diagram 1100, an exemplary first system may set certain thresholds used by an exemplary first system, said thresholds may be fixed or may be modified later by an exemplary first system according to preprogrammed rules. From 1104, flow diagram 1100 may continue with 1106.

In 1106, as illustrated in flow diagram 1100, the exemplary first system may receive a first digital audio stream, said stream may comply with a PSTN audio standard such as, e.g. but not limited to G.711 A-Law or G.711 μ-Law. From 1106, flow diagram 1100 may continue with 1108.

In 1108, as illustrated in flow diagram 1100, the exemplary first system may segment the said first digital audio stream according to one or more preprogrammed rule (s) to generate a sequence of samples of pre-programmed size. From 1108, flow diagram 1100 may continue with 1110.

In 1110, as illustrated in flow diagram 1100, the exemplary first system may compress or not compress the said segmented first digital audio stream samples according to one or more preprogrammed rule(s), which may depend on, e.g., but not limited to the end-to-end throughput characteristics of the network, the number of simultaneous calls currently on progress, etc., using one of pre-programmed compression algorithms e.g., but not limited to any algorithm optimized for voice compression or silence suppression, to generate a sequence of processed samples. From 1110, flow diagram 1100 may continue with 1112.

In 1112, as illustrated in flow diagram 1100, the exemplary first system may accumulate said first digital audio stream processed samples in an aggregation buffer. From 1112, flow diagram 1100 may continue with 1114.

In 1114, as illustrated in flow diagram 1100, the exemplary first system may compare the contents of the aggregation buffer to a threshold, said threshold may be fixed or may be calculated according to one or more preprogrammed rule(s), which may depend on, e.g., but not limited to the end-to-end throughput characteristics of the network, a pre-specified forwarding period, a pre-specified number of processed samples, the number of simultaneous calls currently on progress etc., and if the threshold is determined to be reached, then flow diagram 1000 may continue with 1122 and if the threshold is determined not to have been reached, then flow diagram 1100 may continue with 1116.

In 1116, as illustrated in flow diagram 1100, logic of the exemplary first system may determine whether the incoming PSTN-compatible signal has ended, and if so, then flow diagram may continue with 1120 where the upper portion of flow diagram 1100 may end, and if it is determined that the incoming PSTN-compatible signal has not ended, then flow diagram 1100 may continue with 1118. In another exemplary embodiment, exemplary flow diagram 1100 need not end and may loop back continually to 1102 or to 1104 in another exemplary embodiment.

In 1118, as illustrated in flow diagram 1100, the exemplary first system may calculate a new aggregation threshold according to one or more preprogrammed rule(s), which may depend on, e.g., but not limited to the end-to-end throughput characteristics of the network, a pre-specified forwarding period, a pre-specified number of processed samples, the number of simultaneous calls currently on progress etc. In another exemplary embodiment, exemplary flow diagram 1100 may recalculate a new aggregation threshold e.g. but not limited to, at the end of an incoming signal, at pre-determined time intervals, never. From 1118, flow diagram 1100 may continue with 1106.

In 1124, as illustrated in flow diagram 1100, the exemplary first system may combine the first group of processed samples from said first incoming PSTN compatible audio stream with groups of samples from other incoming PSTN compatible audio streams to create a batch of samples ready for transmission to a second system. From 1124, flow diagram 1100 may continue with 1126.

In 1126, as illustrated in flow diagram 1100, the exemplary first system may determine if the forwarding threshold has been reached, said threshold may be fixed or may be calculated according to one or more preprogrammed rule(s), which may depend on, e.g., but not limited to the end-to-end throughput characteristics of the network, a pre-specified forwarding period, the number of simultaneous calls currently on progress, a pre-specified throughput limit in e.g. but not limited to, a number of packets per second, etc., and if the threshold is determined to be reached, then flow diagram 1100 may continue with 1128 and if the threshold is determined not to have been reached, then flow diagram 1100 may continue with 1134

In 1128, as illustrated in flow diagram 1100, the exemplary first system may calculate and set the next forwarding threshold. From 1128, flow diagram 1100 may continue with 1130.

In 1130, as illustrated in flow diagram 1100, the exemplary first system may create a single digital message containing the said batch of processed samples according to one or more preprogrammed rule(s), which may define, e.g. but not limited to a pre-specified data link protocol. From 1130, flow diagram 1100 may continue with 1132.

1132, as illustrated in flow diagram 1100, the exemplary first system may create a digital message in a single network compatible data packet or sequence of data packets containing the said single digital message according to one or more preprogrammed rule(s), for transmission across the network from the first system to the second system over a wireless packet data network which may define, e.g. but not limited to a pre-specified network protocol. 1132, flow diagram 1100 may continue with 1134.

1134, as illustrated in flow diagram 1100, the exemplary first system may calculate a new forwarding threshold according to one or more preprogrammed rule(s), which may depend on, e.g., but not limited to the end-to-end throughput characteristics of the network, a pre-specified forwarding period, the number of simultaneous calls currently on progress, a pre-specified throughput limit in e.g. but not limited to, a number of packets per second, etc. In another exemplary embodiment, exemplary flow diagram 1100 may recalculate a new forwarding threshold e.g. but not limited to, at the end of an incoming signal, at pre-determined time intervals, never. From 1134, flow diagram 1100 may continue with 1124 and may loop back continually to 1124.

It is important to note that all exemplary flow diagrams are deemed to be of an example nature, and are intended not to be limited, but rather exemplary in nature to ease those of ordinary skill in the relevant art to more easily make and use the claimed inventions. Although not shown, it will be apparent to those skilled in the art that various steps of flow diagram 1100, may be performed in parallel, serially, and/or continually, according to an alternative exemplary embodiment.

According to another exemplary embodiment, in addition to the exemplary first system according to FIG. 11, the process may continue (or proceed in parallel), e.g., with similar functionality by a second system in communication with the first system such as, e.g., but not limited to, the flow diagram of FIG. 9.

First Exemplary Embodiments for Connecting or Coupling PSTN Compatible Audio Communications Systems Over a Wireless Packet Data Network In an exemplary embodiment, device 100 (i.e., 100a, 100b, 100c, 100d, 100e, collectively "device 100") may provide the ability to receive PSTN compatible 206 signals, such as, for example, e.g., but not limited to, from an analog line or from a digital TDM link, and decode these signals. While exemplary attributes such as PSTN 206 line, analog line, FXS, FXO, E&M, TDM link, or T1 and E1 trunks may be described, the foregoing terminology are employed for illustrative purposes only and are in no way to be construed as limitations of the present embodiments.

In an exemplary embodiment, device 100 may provide the ability to convert between transmission protocols, such as, e.g., but not limited to, from a TDM data structure to IP, and back again. An exemplary feature of the equipment described may be the ability to provide a connection path for TDM links as transparently as possible to the systems connected at both ends, regardless of the transport medium and any intermediate protocols used to provide the connection. Two variables that may be accommodated in order for the proposed solution to be flexible and operate with a wide variety of potential network solutions include, e.g., but are not limited to, (i) accommodation for a wide potential variation in time delay across the network path, and (ii) buffering to allow the continuous operation of the transmission protocol, such as, e.g., exemplary TDM circuits, while receiving and transmitting discontinuous data packets over the network, such as, e.g., exemplary IP connection or coupling (for example, to compensate for gaps between blocks of information received from the packet data networks 310 that need to be continuously transmitted without a break over the TDM circuit).

As outlined above, the basic method of operation of a packet based data network 310 may include that of accumulating information for a period of time and then transmitting it in a burst of data known as a packet. There is therefore a period of accumulation during which time the data may be stored at the transmitting end of the link, a processing delay while the "packet" is created, a period of packet transmission, a period of accumulation at the receiving end of the link, a period of processing at the receiving end of the link and finally a period of transmission to the local equipment. The actual delays incurred may vary considerably from packet to packet. In addition to the variations in packet delay incurred during the process described above, additional very significant delays may be incurred traversing the network architecture, specifically in the case of some cellular wireless and satellite links but also over international links such as, e.g., but not limited to, through gateways between public IP data networks (not shown).

Referring to FIG. 3, in this embodiment both the PSTN compatible communication systems 302 and 308 may be connected or coupled to the described devices 100a, and 100b and may exchange transmissions across a wireless packet data network. PSTN compatible audio signals may be received by device 100a, processed according preprogrammed rules, converted to a symbol stream, merged with other symbol streams from other PSTN compatible audio signals, and may be transmitted to the other device 100b over the network 310. At the receiving side 100b of network 310 the received symbols may be separated into independent PSTN compatible audio streams, each independent stream may be processed according to preprogrammed rules, buffered in an exemplary jitter buffer (not shown) within device 100b for a period of time to accommodate variations in delay over network 310, after which the symbols may be transmitted to the attached system 308 as PSTN compatible audio signals using the appropriate analog or digital structure of communication with system 308.

In an exemplary embodiment, PSTN compatible audio signals may be transmitted between the devices 100 over network 310 within a sufficient time period that PSTN compatible audio signals may be regenerated at the receiving side of devices 100 without a break in the audio. Any delay beyond that accommodated by the exemplary jitter buffers of devices 100, or any loss of packet information at a receiving device 100 may lead to a break in the timely transmission of the audio signal to the attached systems 302, 308 which may in turn cause an interruption and possibly in some circumstances an eventual failure of the communications. Such failure in communications may typically be caused by irrecoverable loss of critical audio and/or a procedural timeout during a PSTN call, e.g., but not limited to a facsimile or dial-modem data call.

As outlined above, conventional VoIP systems typically generate a continuous stream of IP packets for every call in progress. In an attempt to reduce the bandwidth required to support VoIP calls a voice compression algorithm is sometimes used, and in such cases the IP overhead associated with each packet may often exceed the size of the compressed audio payload by several factors. Additionally, conventional VoIP systems generate an independent IP packet stream for each call in progress even though said calls may be traversing the same network connections. Furthermore, conventional VoIP systems often create additional large IP packets to initiate a VoIP call, e.g., using a Session Initiation Protocol (SIP). As a consequence of these processes, conventional VoIP systems often generate a large number of packets, the majority of each packet consisting of IP packet overhead which can greatly increase loading on the network and consequently the likelihood of packets being delayed or discarded due to bandwidth or packet processing bottlenecks within the network.

In accordance with an exemplary embodiment of the present invention conventional VoIP systems may be improved upon to reduce the likelihood of packets being delayed or discarded by a wireless packet data network. In the applications of interest, which may include the transmission of multiple PSTN compatible audio signals between devices 100 over a wireless packet data network, a combination of techniques and preprogrammed rules are used to optimize the packet stream for the communication of a single and/or of many simultaneous PSTN compatible audio signals between devices 100 over an LTE wireless packet data network.

Referring again to FIG. 3 and FIG. 5 in an exemplary embodiment, devices 100 can receive audio signals from PSTN compatible devices and decode any audio tones which or may not be present to determine which of a plurality of compression techniques and preprogrammed rules may be applied to the audio signal being received, e.g., but not limited to a facsimile transmission, a dial-modem transmission, DTMF or FSK key detection. Additionally devices 100 may determine based on preprogrammed rules that audio stream samples may be passed uncompressed to subsequent stages of processing within the device 100 based on e.g., but not limited to the number of current active calls in progress.

In an exemplary embodiment, device 100 can receive audio tones from PSTN lines and decode these tones as DTMF, FSK, PSK, QAM or other encoded signal types and which signal types are all considered audio tones or signals for the current description. Device 100 can also transmit audio tones to PSTN 206 lines and encode these tones as DTMF, FSK, PSK, QAM or other encoded signal types and which signal types are all considered audio tones or signals for the current description.

In an exemplary embodiment, devices 100 can aggregate compressed or uncompressed audio samples from one or more PSTN compatible audio signals and store and delay forwarding for transmission based on preprogrammed or learned rules which may depend e.g., but not limited to the number of current active calls in progress.

In an exemplary embodiment, devices 100 can exchange messages over network 310 using a preprogrammed link level protocol and message format optimized for communication over an LTE wireless packet data network. Said link level protocol may provide the ability to establish pier to pier connections between devices 100 so that call connect times are greatly reduced compared to standard VoIP systems or are eliminated completely. Said link level protocol may provide the ability to combine/separate multiple compressed or uncompressed audio streams which may be using the same or different audio compression techniques into one packet stream. Said link level protocol may be operable according to preprogrammed or learned rules.

Second Exemplary Embodiments for Connecting PSTN Compatible Audio Communications Systems Over a Wireless Packet Data Network Referring to FIG. 6 and FIG. 7 in an exemplary embodiment, devices 100 can receive audio samples from VoIP compatible devices and process said samples using preprogrammed or learned rules for the transmission of said samples over a wireless packet data network using the aforementioned exemplary processes of devices 100.

Referring to FIG. 6, in an exemplary embodiment 600, device 100*c* provides the ability to receive VoIP packets directly, such as, e.g., but not limited to from a VoIP service provider or a VoIP communications device, and act as a VoIP gateway converting these packets to PSTN 206 compatible signals (not illustrated), or as illustrated, regenerated as PSTN compatible audio signals by the receiving device 100*d* connected directly to PSTN compatible communication system 302 by an analog line or a TDM link. While exemplary attributes such as VoIP and compression may be described, the foregoing terminology is employed for illustrative purposes only and is in no way to be construed as limitations of the present embodiments.

Referring to FIG. 7, in an exemplary embodiment 700, devices 100*c* and 100*e* provide the ability to receive VoIP packets directly, from, e.g., but not limited to a VoIP service provider or a VoIP communications device. Devices 100 can have the ability to decompress, compress or leave unchanged the VoIP audio payload, can eliminate the IP packet overhead, can aggregate and combine the VoIP audio stream with other VoIP or non-VoIP PSTN compatible audio streams incoming to the device 100, and can transmit to another device 100 over a wireless packet network in a single packet stream using a link level protocol optimized for communication over a wireless packet data network. A device 100 receiving the said optimized link level packet stream can use preprogrammed or learned rules to separate out the individual audio streams, can decompress, compress or leave unchanged the VoIP audio payload, can regenerate the IP packet information, and can buffer and retransmit the reconstituted VoIP packet stream to a connected e.g., but not limited to a VoIP service provider or a VoIP communications device.

An Exemplary Computer System

Figure 4:
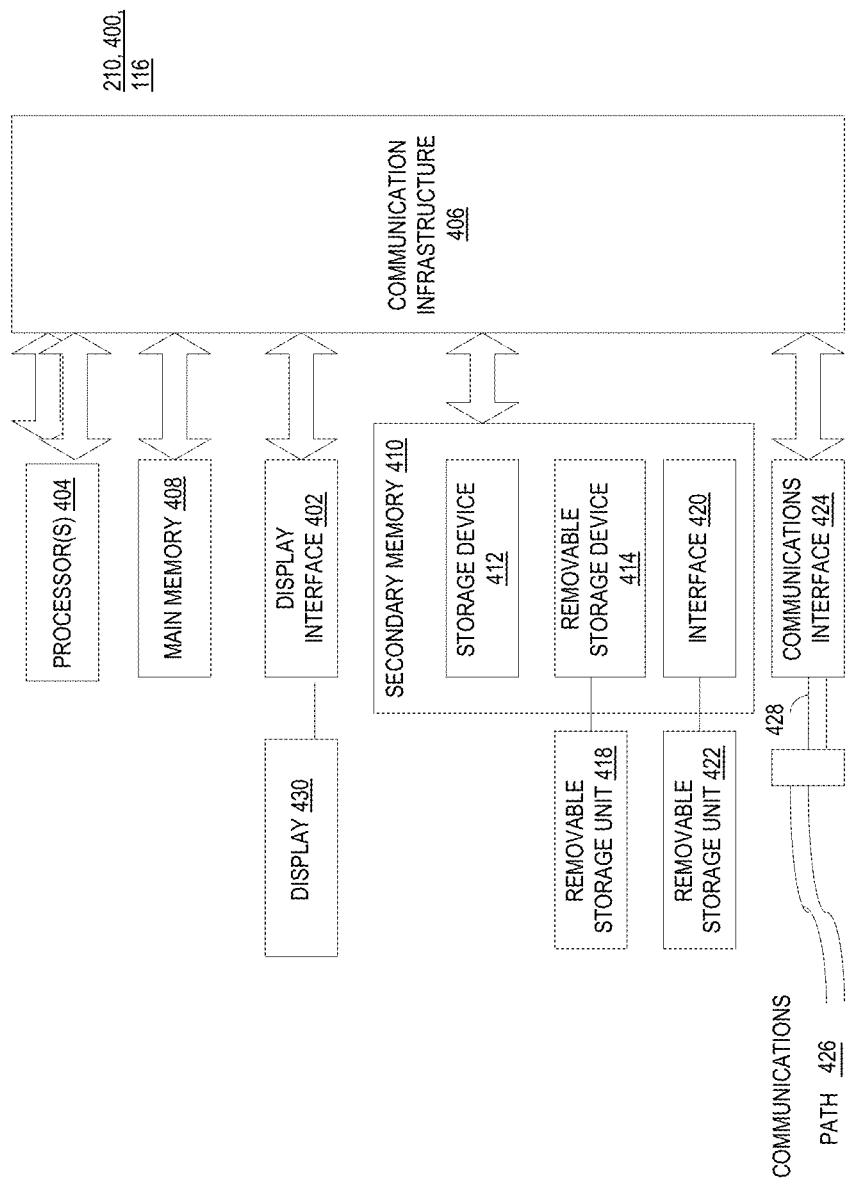
FIG. 4 illustrates an exemplary embodiment of a computer system that may be used to practice the system and/or methods in accordance with the various exemplary embodiments.

FIG. 4 depicts an exemplary embodiment of a computer system 400 that may be used in association with, in connection with, and/or in place of, but not limited to, computer platform 116, according to exemplary embodiments of the present invention.

The present embodiments (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 400 is shown in FIG. 4, depicting an exemplary embodiment of a block diagram of an exemplary computer system useful for implementing the present invention. Specifically, FIG. 4 illustrates an example computer 400, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/, etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., MAC/OS, MAC/OSX, IOS, etc. from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Indeed aspects of systems may include devices with various other input and/or output subsystems including, e.g., but not limited to, tablet displays, keyboards, various sensor(s), touch screen sensors, pressure sensors, location sensors (e.g., global positioning system (GPS), etc.), accelerometers, multi-dimensional sensor(s), temporal based datalogs, etc. Instead, the invention may be implemented on any appropriate computer system running any appropriate operating system. In one exemplary embodiment, the present invention may be implemented on a computer system operating as discussed herein. An exemplary computer system, computer 400 is shown in FIG. 4. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, peer-to-peer devices, tablets, touch-enabled devices, sensor enabled devices, location sensing devices, convertible, table/laptop, mobile, smart devices, smart phones, phablets, wearable technology, watch devices, glass devices, routers, web servers, data, media, audio, video, telephony or streaming technology servers, etc., may also be implemented using a computer such as that shown in FIG. 4 and/or additional subsystems perhaps not all shown, as discussed.

The computer system 400 may include one or more processors, such as, e.g., but not limited to, processor(s) 404. The processor(s) 404 may be connected to a communication infrastructure 406 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 400 may include a display interface 402 that may forward, e.g., but not limited to, graphics, text, and other data, etc., from the communication infrastructure 406 (or from a frame buffer, etc., not shown) for display on the display unit 430.

The computer system 400 may also include, e.g., but may not be limited to, a main memory 408, random access memory (RAM), and/or a secondary memory 410, etc. The secondary memory 410 may include, for example, (but not limited to) a hard disk drive 412, flash memory, a storage device, and/or a removable storage drive 414, representing a floppy diskette drive, a magnetic tape drive, an optical disk drive, a compact disk drive CD-ROM, etc. The removable storage drive 414 may, e.g., but not limited to, read from and/or write to a removable storage unit 418 in a well known manner Removable storage unit 418, also called a program storage device or a computer program product, may represent, e.g., but not limited to, a floppy disk, magnetic tape, optical disk, compact disk, etc. which may be read from and written to by removable storage drive 414. As will be appreciated, the removable storage unit 418 may include a computer usable storage medium having stored therein computer software and/or data.

In alternative exemplary embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 422 and interfaces 420, which may allow software and data to be transferred from the removable storage unit 422 to computer system 400.

Computer 400 may also include an input device such as, e.g., (but not limited to) a mouse or other pointing device such as a digitizer, and a keyboard or other data entry device (none of which are labeled).

Computer 400 may also include output devices, such as, e.g., (but not limited to) display 430, and display interface 402. Computer 400 may include input/output (I/O) devices such as, e.g., (but not limited to) communications interface 424, cable 428 and communications path 426, etc. These devices may include, e.g., but not limited to, a network interface card, and modems (neither are labeled). Communications interface 424 may allow software and data to be transferred between computer system 400 and external devices. Examples of communications interface 424 may include, e.g., but may not be limited to, a modem, a network interface (such as, e.g., an Ethernet card), a communications port, a Personal Computer Memory Card International Association (PCMCIA) slot and card, etc. Software and data transferred via communications interface 424 may be in the form of signals 428 which may be electronic, electromagnetic, optical or other signals capable of being received by communications interface 424. These signals 428 may be provided to communications interface 424 via, e.g., but not limited to, a communications path 426 (e.g., but not limited to, a channel) This channel 426 may carry signals 428, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 414, a hard disk installed in hard disk drive 412, and signals 428, etc. These computer program products may provide software to computer system 400. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

Computer programs (also called computer control logic), may include object oriented computer programs, and may be stored in main memory 408 and/or the secondary memory 410 and/or removable storage units 414, also called computer program products. Such computer programs, when executed, may enable the computer system 400 to perform the features of the present invention as discussed herein. In particular, the computer programs, when executed, may enable the processor 404 to provide a method to resolve conflicts during data synchronization according to an exemplary embodiment of the present invention. Accordingly, such computer programs may represent controllers of the computer system 400.

In another exemplary embodiment, the invention may be directed to a computer program product comprising a computer readable medium having control logic (computer software) stored therein. The control logic, when executed by the processor 404, may cause the processor 404 to perform the functions of the invention as described herein. In another exemplary embodiment where the invention may be implemented using software, the software may be stored in a computer program product and loaded into computer system 400 using, e.g., but not limited to, removable storage drive 414, hard drive 412 or communications interface 424, etc. The control logic (software), when executed by the processor 404, may cause the processor 404 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The exemplary embodiment of the present invention makes reference to wired, or wireless networks. Wired networks include any of a wide variety of well known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G wireless, Bluetooth, Infrared Data Association (IrDA), shared wireless access protocol (SWAP), "wireless fidelity" (Wi-Fi), WIMAX, and other IEEE standard 802.11- compliant wireless local area network (LAN), 802.16-compliant wide area network (WAN), and ultrawideband (UWB), etc.

Bluetooth is a wireless technology promising to unify several wireless technologies for use in low power radio frequency (RF) networks.

IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless Ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d or g, such as, e.g., but not limited to, IEEE std. 802.11a, b, d and g, (including, e.g., but not limited to IEEE 802.11g-2003, etc.), etc.

CONCLUSION

Although the invention is described in terms of these example environments, it is important to note that description in these terms is provided for purposes of illustration only. It is not intended that the invention be limited to these example environments or to the precise inter-operations between the above-noted entities and devices. In fact, after reading the following description, it will become apparent to a person skilled in the relevant art how to implement the invention in alternative environments.

What is claimed is:

1. A system for transmitting and receiving public switched telephone network (PSTN) compatible audio frequency signals over a wireless packet data network comprising:
a first system configured to:
  receive one or more first incoming PSTN-compatible audio frequency signals;
  digitize said one or more first incoming PSTN-compatible audio frequency signals according to an audio standard to obtain first digitized PSTN-compatible audio frequency signals;
  segment said first digitized PSTN-compatible audio frequency signals to generate one or more first sequences of audio signal samples, each of said one or more first sequences of audio signal samples comprising a first preprogrammed sample size;
  compress said each of said one or more first sequences of audio signal samples according to a first preprogrammed set of rules comprising a first preprogrammed compression algorithm, to produce a first sequence of one or more strings of processed samples, if said each of said one or more first sequences of audio signal samples is determined to meet a first preprogrammed criteria for compression according to said first preprogrammed set of rules;
  accumulate said first sequence of said one or more strings of processed samples to create a first group of samples ready for transmission according to a first aggregation threshold defined by a second preprogrammed set of rules,
  create a first outgoing digital message from said first group of samples ready for transmission according to a forwarding threshold defined by a third preprogrammed set of rules, using at least one of:
    a first pre-defined data link protocol, or
    a first control channel;
  transmit said first outgoing digital message over the wireless packet data network to a second system;
  receive, from the wireless packet data network, and interpret, a first incoming digital message from the second system;
  process said first incoming digital message into one or more incoming digital audio stream samples according to said third pre-programmed set of rules comprising said first pre-defined data link protocol, or said first control channel, or a second pre-defined data link protocol, or a second control channel; and
  accumulate and process said one or more incoming digital audio stream samples according to a fourth preprogrammed set of rules comprising being configured to:
    decompress any compressed of said one or more incoming digital audio stream samples according to a first preprogrammed decompression algorithm defined by said fourth preprogrammed set of rules into decompressed digital audio samples;
    accumulate said first decompressed digital samples into a first buffer according to a first jitter buffer threshold, wherein said first jitter buffer threshold is defined by said fourth preprogrammed set of rules; and
    regenerate first outgoing PSTN-compatible audio frequency signals based on said first decompressed digital audio samples.

2. The system of claim 1, wherein the wireless packet data network comprises an Internet protocol (IP) based network.

3. The system of claim 1, wherein the wireless packet data network comprises an LTE wireless packet data network.

4. The system of claim 1, further comprising:
the second system coupled to said first system configured to
  receive one or more second incoming PSTN-compatible audio frequency signals;
  digitize said one or more second incoming PSTN-compatible audio frequency signals according to an audio standard to obtain second digitized PSTN-compatible audio frequency signals;
  segment said second digitized PSTN-compatible audio frequency signals to generate one or more second sequences of audio signal samples, each of said one or more second sequences of said audio signal samples comprising said first preprogrammed sample size or a second preprogrammed sample size;
  compress said each of said one or more second sequences of audio signal samples according to said first preprogrammed set of rules or a fifth preprogrammed set of rules comprising said first preprogrammed compression algorithm or a second preprogrammed compression algorithm, to produce a second sequence of one or more strings of processed samples, if said each of said one or more second sequences of audio signal samples is determined to meet said first preprogrammed criteria, or a second preprogrammed criteria for compression according to said first or said fifth preprogrammed set of rules;

accumulate said second sequence of said one or more strings of processed samples to create a second group of samples ready for transmission according to said first aggregation threshold, or a second aggregation threshold defined by a sixth preprogrammed set of rules;

create a second outgoing digital message from said second group of samples ready for transmission according to said forwarding threshold, or a second forwarding threshold defined by a seventh preprogrammed set of rules, wherein said second outgoing digital message for transmission is created using said first or said second pre-defined data link protocol, or said first or said second control channel, or a third pre-defined data link protocol, or a third control channel;

transmit said second outgoing digital message over the wireless packet data network to said first system;

receive at the second system from the wireless packet data network, and interpret, a second incoming digital message from said first system; and process said second incoming digital message into one or more second incoming digital audio stream samples according to said third preprogrammed set of rules or an eighth preprogrammed set of rules comprising said first, said second, or said third pre-defined data link protocol, or said first, said second, or said third control channel, or a fourth pre-defined data link protocol or a fourth control channel;

accumulate and process said one or more second incoming digital audio stream samples according to said fourth preprogrammed set of rules, or a ninth preprogrammed set of rules;

decompress said one or more of said second incoming digital audio sample streams according to a second pre-programmed decompression algorithm as defined by said fourth or said ninth pre-programmed set of rules into second decompressed digital audio samples;

accumulate said second decompressed digital audio samples into a second buffer according to a second jitter buffer threshold, wherein said second jitter buffer threshold is defined by said fourth or said ninth preprogrammed set of rules; and regenerate second outgoing PSTN-compatible audio frequency signals based on said second decompressed digital audio samples.

5. The system of claim 4, wherein said first system and the second system are located at least one of:
at a single location, or
at different locations.

6. The system of claim 4, wherein the system is configured to use at least one of:
predetermined information,
learned information, or
preconfigured information,
to determine at least one of said first, said second, said third, or said fourth preprogrammed rules to apply to process said first or said second signal information and forward messages between said first and the second systems.

7. The system of claim 4, wherein said ninth preprogrammed set of rules comprises configuring the system to at least one of any one or more of:

define a size of said second jitter buffer; or
define a size of said second jitter buffer on a call by call basis; or
define a size of said jitter buffer based on at least one of any one or more of:
a predetermined criteria, or
a fixed criteria, or
dynamically collected operational data,
wherein said dynamically collected operational data comprises at least one or more of:
current network jitter, or
current network delay, or
current network loading, or
packet loss, or
network data errors, or
time of day, or
QoS requirements, or
wherein said dynamically collected operational data comprises being configured to be at least one of any one or more of:
collected locally, or
sourced from externally connected equipment comprising at least
one of any one or more of:
a router, or
performance monitoring equipment.

8. The system of claim 1, wherein the system further comprises:
an interface to a voice over Internet protocol (VoIP) packet system.

9. The system of claim 1, wherein the system further comprises wherein at least one of: said first system, or the second system, is configured to at least one of:
compress, or
decompress, at least one of:
PSTN, or
VoIP,
compatible audio signals.

10. The system of claim 1, comprising:
wherein said first control channel comprises at least one of:
an in-band control channel, or
an out-of-band control channel, and
wherein said first control channel is configured to:
remotely manage and provide a mechanism to pass control information for synchronization between, said first and the second systems,
wherein said mechanism is configured to pass said control information at least one of:
during initialization,
during routing changes,
to enable changes in size of jitter buffers, or
to turn compression on or off during a call, and
provide communications to perform at least one of:
facilitate transportation of a plurality of strings of said processed samples with a single string of digital messages;
provide monitoring function;
provide a control function;
determine real time diagnostic information;
determine status information; or
determine ancillary information.

11. The system according to claim 1, wherein said at least one first, second, third, or fourth preprogrammed set of rules comprises at least one of:
a) at least one intelligent, dynamic, or buffered preprogrammed rule based on positive feedback;

b) at least one preprogrammed rule dependent upon a type of the wireless packet data network over which the PSTN compatible audio frequency signals are transmitted;
c) wherein said at least one of said at least one first, second, third, or fourth preprogrammed rule is configured to at least one of:
regenerate as accurately as possible, the PSTN-compatible audio frequency signals, or
reproduce a channel regardless of content transported, while said at least one first, second, third, or fourth preprogrammed rule maintains integrity of the PSTN-compatible audio frequency signals;
d) wherein if voice over IP (VoIP) packets are received, either segmenting and compressing first, or if already compressed, then proceeding to accumulating audio signal samples, and combining and creating an aggregated digital message for transmitting; or
e) wherein if receiving and interpreting a second incoming digital message at the second system from said first system, processing to isolate a second incoming digital audio stream, and determining if the second incoming digital audio stream is going to a VoIP system, and then processing digital samples of said incoming digital message and outputting packets containing digital audio stream information, and if determined not to be going to said VoIP system, then first processing samples of the incoming digital messages including decompressing if required, accumulating processed samples in a jitter buffer, and regenerating a second outgoing PSTN-compatible audio signal; or
f) setting an aggregation threshold and a forwarding threshold, receiving a third incoming PSTN-compatible digital audio signal, segmenting the third incoming PSTN-compatible digital audio signal into a segmented audio signal sample, compressing the segmented audio signal sample into a compressed audio signal sample, buffering in an aggregation buffer the compressed audio signal sample, and
determining if the aggregation threshold has been met, and if the aggregation threshold is determined not met then
determining if the incoming signal end has been reached and
if the incoming signal end is determined to be reached then ending, or
if the end of the incoming signal has not been reached then
updating the aggregation threshold, and
if the determining if the aggregation threshold has been met is determined to be met then
forwarding samples for transmission,
merging samples from multiple audio streams into a group of merged samples, and preparing for transmission of the group of merged samples, and then
determining whether the forwarding threshold is met, and
if the forwarding threshold is determined to be met, then
first setting a next forwarding threshold,
creating a digital message, and
transmitting the digital message from said first system to
the second system over the wireless packet data network; or if the forwarding threshold is determined to not have been met then proceeding immediately; and
updating the forwarding threshold.

12. The system according to claim 1,
wherein said first system configured to segment comprises being configured to:
reassemble and resegment said first digitized incoming PSTN-compatible audio frequency signals, if a sample size is different from a desired sample size.

13. The system according to claim 1,
wherein said first preprogrammed rules comprises being configured to:
compress, using said first preprogrammed compression algorithm, any of said each of said one or more first sequences of said audio signal samples if said first preprogrammed criteria for compression according to said first preprogrammed set of rules determines it is desired to compress said any of said each of said one or more first sequences of said audio signal samples; and
not compress any of said each of said one or more first sequences of audio signal samples, according to said first preprogrammed set of rules, if said first preprogrammed criteria for compression according to said first preprogrammed set of rules determines it is not desired to compress said any of said each of said one or more first sequences of said audio signal samples,
wherein said first preprogrammed criteria for compression according to said first preprogrammed set of rules comprises being configured to determine desirability of compression or noncompression is based on any one or more of:
if the call is determined to have already been compressed; or
fewer than a predefined number of calls are determined to be currently in progress; or
if the call is from a wireless phone; or
if the call is international; or
if the call is between certain times of the day; or
if the call is an emergency call; or
if the call is an otherwise prioritized call; or
if the call is a facsimile call; or
if the call is a data modem call; or
if the call meets other preprogrammed criteria; or
if predetermined characteristics of the network are operating within certain performance limits comprising any one or more of the following:
network loading; or
network delay; or
network jitter; or
network data errors; or
packet loss; or
if characteristics measured in real time of the network are operating within certain performance limits comprising any one or more of:
network loading; or
network delay; or
network jitter; or
network data errors; or
packet loss.

14. The system according to claim 1,
wherein said second preprogrammed set of rules comprises being configured to:
define said first aggregation threshold that determines when a said first group of outgoing samples is ready for transmission; and wherein said first aggregation threshold comprises
being configured to be at least one of any one or
more of:
fixed; or
variable, based on a plurality of factors, wherein said
plurality of factors comprises at least one of any one
or more of:
a number of outgoing samples ready for transmission; or
an amount of data that may be transmitted in a next packet; or
a maximum packet size; or
a timer; or
a number of calls in progress; or
a priority of certain call types; or
another factors.

15. The system according to claim 1,
wherein said third preprogrammed set of rules comprises
being configured to any one or more of:
merge to create one or more packets of data for transmission; or
define an order of priority, if multiple packets are to be transmitted; or
define frequency of when packets are to be sent; or
define a time at which packets are to be sent; or
define size of packets; or
adjust the forwarding threshold based upon at least one of any one or more of:
taking into account real time factors comprising any one or more of:
current network operating characteristics comprising at least one of any one or more of:
loading; or
delay; or
jitter; or
packet loss; or
data errors; or
availability of alternative routing; or
availability of additional bandwidth on demand; or
number of calls in progress; or
time of day; or
emergency network loading; or
other network loading; or
Quality of Service (QoS) requirements; or
Prioritization.

16. The system according to claim 1,
wherein said accumulate said first sequence of said one or more strings of processed samples to create said first group of samples ready for transmission according to said first aggregation threshold defined by said second preprogrammed set of rules, comprises wherein said first system comprises an aggregation buffer.

17. The system according to claim 1,
wherein said the wireless packet data network comprises
a communications network comprising:
at least one wireless network.

18. A method for transmitting and receiving public switched telephone network (PSTN) compatible audio frequency signals over a wireless packet data network comprising:
receiving, by at least one processor of a first system, one or more first incoming PSTN-compatible audio frequency signals;
digitizing, by said at least one processor of said first system, said one or more first incoming PSTN-compatible audio frequency signals according to an audio standard obtaining first digitized PSTN-compatible audio frequency signals;
segmenting, by said at least one processor of said first system, said first digitized PSTN-compatible audio frequency signals to generate one or more first sequences of audio signal samples, each of said one or more first sequences of audio signal samples comprising a first preprogrammed sample size;
compressing, by said at least one processor of said first system, said each of said one or more first sequences of audio signal samples according to a first preprogrammed set of rules comprising using a first preprogrammed compression algorithm, producing a first sequence of one or more strings of processed samples, if said each of said one or more first sequences of audio signal samples is determined to meet a first preprogrammed criteria for compression according to said first preprogrammed set of rules;
accumulating, by said at least one processor of said first system, said first sequence of said one or more strings of processed samples creating a first group of samples ready for transmission according to a first aggregation threshold defined by a second preprogrammed set of rules;
creating a first outgoing digital message from said first group of samples ready for transmission according to a forwarding threshold defined by a third preprogrammed set of rules, using at least one of:
a first pre-defined data link protocol, or
a first control channel;
transmitting, by said at least one processor of said first system, said first outgoing digital message over the wireless packet data network to a second system;
receiving, by said at least one processor of said first system, from the wireless packet data network, and interpreting, by said at least one processor of said first system, a first incoming digital message from the second system;
processing, by said at least one processor of said first system, said first incoming digital message into one or more incoming digital audio stream samples according to said third pre-programmed set of rules comprising said first pre-defined data link protocol, or said first control channel, or a second pre-defined data link protocol, or a second control channel; and
accumulating and processing said one or more incoming digital audio stream samples according to a fourth preprogrammed set of rules comprising being configured to:
decompressing any compressed of said one or more incoming digital audio stream samples according to a first preprogrammed decompression algorithm defined by said fourth preprogrammed set of rules into decompressed digital audio samples;
accumulating said first decompressed digital samples into a first buffer according to a first jitter buffer threshold, wherein said first jitter buffer threshold is defined by said fourth preprogrammed set of rules; and
regenerating, by said at least one processor of said first system, first outgoing PSTN-compatible audio frequency signals based on said first decompressed digital audio samples.

19. The method of claim 18, wherein the wireless packet data network comprises an Internet protocol (IP) based network.

20. The method of claim 18, wherein the wireless packet data network comprises a LTE wireless packet data network.

21. The method of claim 18, further comprising:
receiving, by at least one processor of the second system, one or more second incoming PSTN-compatible audio frequency signals;
digitizing, by said at least one processor of the second system, said one or more second incoming PSTN-compatible audio frequency signals according to an audio standard obtaining second digitized PSTN-compatible audio frequency signals;
segmenting, by said at least one processor of the second system, said second digitized PSTN-compatible audio frequency signals generating one or more second sequences of audio signal samples, each of said one or more second sequences of said audio signal samples comprising said first preprogrammed sample size or a second preprogrammed sample size;
compressing said each of said one or more second sequences of audio signal samples according to said first preprogrammed set of rules or a fifth preprogrammed set of rules comprising said first preprogrammed compression algorithm or a second preprogrammed compression algorithm, producing a second sequence of one or more strings of processed samples, if said each of said one or more second sequences of audio signal samples is determined to meet said first or a second preprogrammed criteria for compression according to said first or said fifth preprogrammed set of rules;
accumulating, by said at least one processor of the second system, said second sequence of said one or more strings of processed samples, creating a second group of samples ready for transmission according to said first aggregation threshold, or a second aggregation threshold defined by a sixth preprogrammed set of rules;
creating a second outgoing digital message from said second group of samples ready for transmission according to said forwarding threshold, or a second forwarding threshold defined by a seventh preprogrammed set of rules, wherein said second outgoing digital message for transmission is created using said first or said second pre-defined data link protocol, or said first or said second control channel, or a third pre-defined data link protocol, or a third control channel;
transmitting, by said at least one processor of the second system, said second outgoing digital message over the wireless packet data network to said first system;
receiving, by said at least one processor of the second system, at the second system from the wireless packet data network, and interpreting, by said at least one processor of the second system, a second incoming digital message from said first system; and
processing, by said at least one processor of the second system, said second incoming digital message into one or more second incoming digital audio stream samples according to said third preprogrammed set of rules or an eighth preprogrammed set of rules comprising said first, said second, or said third pre-defined data link protocol, or said first, said second, or said third control channel, or a fourth pre-defined data link protocol or a fourth control channel;
accumulating, by said at least one processor of the second system, and processing said one or more second incoming digital audio stream samples according to said fourth preprogrammed set of rules, or a ninth preprogrammed set of rules;
decompressing, by said at least one processor of the second system, said one or more of said second incoming digital audio sample streams according to a second preprogrammed decompression algorithm as defined by said fourth or said ninth preprogrammed set of rules into second decompressed digital audio samples;
accumulating, by said at least one processor of the second system, said second decompressed digital audio samples into a second buffer according to a second jitter buffer threshold, wherein said second jitter buffer threshold is defined by said fourth or said ninth preprogrammed set of rules; and
regenerating, by said at least one processor of the second system, second outgoing PSTN-compatible audio frequency signals based on said second decompressed digital audio samples.

22. The method of claim 21, wherein said first system and the second system are at least one of:
at a single location, or
at different locations.

23. The method of claim 21, further comprising:
using at least one of:
predetermined information,
learned information, or
preconfigured information,
in determining at least one of said first, said second, said third, or said fourth preprogrammed rules to apply to processing, by said at least one processor of said first system or the second system, said first or said second signal information and forwarding of messages between said first and the second systems.

24. The method of claim 21, further comprising:
using a control channel comprising at least one of:
using an in-band control channel, or
using an out-of-band control channel,
said using said in-band, or out-of-band control channel comprising:
remotely managing, by said at least one processor of said first system or the second system, said first and the second systems, and
wherein said using said control channel comprises:
providing, by said at least one processor of said first system or the second system, communications performing at least one of:
providing, by said at least one processor of said first system or the second system, a monitoring function;
providing, by said at least one processor of said first system or the second system, a control function;
determining, by said at least one processor of said first system or the second system, real time diagnostic information;
determining, by said at least one processor of said first system or the second system, real time diagnostic information;
determining, by said at least one processor of said first system or the second system, status information; or
determining, by said at least one processor of said first system or the second system, ancillary information.

25. The method of claim 18, further comprising:
providing, by said at least one processor of said first system, an interface to a voice over Internet protocol (VoIP) packet system.

26. The method of claim 18, further comprising:
compressing, and
decompressing,
by said at least one processor of at least one of said first system or the second system, at least one of:
PSTN-compatible, or
VoIP-compatible,
audio signals.

27. A nontransitory computer machine-readable medium that provides instructions, which when executed by a computer processor of a computing platform, causes the computing platform to perform operations comprising a method for transmitting and receiving public switched telephone network (PSTN) compatible audio frequency signals over a wireless packet data network, the method comprising:
receiving, by at least one processor of a first system, one or more first incoming PSTN-compatible audio frequency signals;
digitizing, by said at least one processor of said first system, said one or more first incoming PSTN-compatible audio frequency signals according to an audio standard obtaining first digitized PSTN-compatible audio frequency signals;
segmenting, by said at least one processor of said first system, said first digitized PSTN-compatible audio frequency signals to generate one or more first sequences of audio signal samples, each of said one or more first sequences of audio signal samples comprising a first preprogrammed sample size;
compressing, by said at least one processor of said first system, said each of said one or more first sequences of audio signal samples according to a first preprogrammed set of rules comprising using a first preprogrammed compression algorithm, producing a first sequence of one or more strings of processed samples, if said each of said one or more first sequences of audio signal samples is determined to meet a first preprogrammed criteria for compression according to said first preprogrammed set of rules;
accumulating, by said at least one processor of said first system, said first sequence of said one or more strings of processed samples creating a first group of samples ready for transmission according to a first aggregation threshold defined by a second preprogrammed set of rules;
creating a first outgoing digital message from said first group of samples ready for transmission according to a forwarding threshold defined by a third preprogrammed set of rules, using at least one of:
a first pre-defined data link protocol, or
a first control channel;
transmitting, by said at least one processor of said first system, said first outgoing digital message over the wireless packet data network to a second system;
receiving, by said at least one processor of said first system, from the wireless packet data network, and interpreting, by said at least one processor of said first system, a first incoming digital message from the second system;
processing said first incoming digital message into one or more incoming digital audio stream samples according to said third pre-programmed set of rules comprising said first pre-defined data link protocol, or said first control channel, or a second pre-defined data link protocol, or a second control channel; and
accumulating and processing said one or more incoming digital audio stream samples according to a fourth preprogrammed set of rules comprising being configured to:
decompressing any compressed of said one or more incoming digital audio stream samples according to a first preprogrammed decompression algorithm defined by said fourth preprogrammed set of rules into decompressed digital audio samples;
accumulating said first decompressed digital samples into a first buffer according to a first jitter buffer threshold, wherein said first jitter buffer threshold is defined by said fourth preprogrammed set of rules; and
regenerating, by said at least one processor of said first system, first outgoing PSTN-compatible audio frequency signals based on said first decompressed digital audio samples.

28. The nontransitory computer machine-readable medium of claim 27, wherein the method comprises: performing functions of said first system and the second system at least one of: at a single location, or at different locations.

29. The nontransitory computer machine-readable medium of claim 27, wherein the wireless packet data network comprises a LTE wireless packet data network.

30. The nontransitory computer machine-readable medium of claim 27, wherein the method further comprises:
receiving, by at least one processor of the second system, one or more second incoming PSTN-compatible audio frequency signals;
digitizing, by said at least one processor of the second system, said one or more second incoming PSTN-compatible audio frequency signals according to an audio standard obtaining second digitized PSTN-compatible audio frequency signals;
segmenting, by said at least one processor of the second system, said second digitized PSTN-compatible audio frequency signals generating one or more second sequences of audio signal samples, each of said one or more second sequences of said audio signal samples comprising said first preprogrammed sample size or a second preprogrammed sample size;
compressing said each of said one or more second sequences of audio signal samples according to said first preprogrammed set of rules or a fifth preprogrammed set of rules comprising said first preprogrammed compression algorithm or a second preprogrammed compression algorithm, producing a second sequence of one or more strings of processed samples, if said each of said one or more second sequences of audio signal samples is determined to meet said first or a second preprogrammed criteria for compression according to said first or said fifth preprogrammed set of rules;
accumulating, by said at least one processor of the second system, said second sequence of said one or more strings of processed samples, creating a second group of samples ready for transmission according to said first aggregation threshold, or a second aggregation threshold defined by a sixth preprogrammed set of rules;
creating a second outgoing digital message from said second group of samples ready for transmission according to said forwarding threshold, or a second forwarding threshold defined by a seventh preprogrammed set of rules, wherein said second outgoing digital message for transmission is created using said first or said second pre-defined data link protocol, or said first or said second control channel, or a third pre-defined data link protocol, or a third control channel;

transmitting, by said at least one processor of the second system, said second outgoing digital message over the wireless packet data network to said first system;

receiving, by said at least one processor of the second system, at the second system from the wireless packet data network, and interpreting, by said at least one processor of the second system, a second incoming digital message from said first system; and processing, by said at least one processor of the second system, said second incoming digital message into one or more second incoming digital audio stream samples according to said third preprogrammed set of rules or an eighth preprogrammed set of rules comprising said first, said second, or said third pre-defined data link protocol, or said first, said second, or said third control channel, or a fourth pre-defined data link protocol or a fourth control channel;

accumulating, by said at least one processor of the second system, and processing said one or more second incoming digital audio stream samples according to said fourth preprogrammed set of rules, or a ninth preprogrammed set of rules;

decompressing, by said at least one processor of the second system, said one or more of said second incoming digital audio sample streams according to a second preprogrammed decompression algorithm as defined by said fourth or said ninth preprogrammed set of rules into second decompressed digital audio samples;

accumulating, by said at least one processor of the second system, said second decompressed digital audio samples into a second buffer according to a second jitter buffer threshold, wherein said second jitter buffer threshold is defined by said fourth or said ninth preprogrammed set of rules; and regenerating, by said at least one processor of the second system, second outgoing PSTN-compatible audio frequency signals based on said second decompressed digital audio samples.

\* \* \* \* \*